United States Patent
Pei

(10) Patent No.: US 6,723,828 B2
(45) Date of Patent: Apr. 20, 2004

(54) CONJUGATED ELECTROLUMINESCENT POLYMERS AND ASSOCIATED METHODS OF PREPARATION AND USE

(75) Inventor: Qibing Pei, Fremont, CA (US)

(73) Assignee: SRI International, Menlo Park, CA (US)

(*) Notice: Subject to any disclaimer, the term of this patent is extended or adjusted under 35 U.S.C. 154(b) by 0 days.

(21) Appl. No.: 09/864,704

(22) Filed: May 23, 2001

(65) Prior Publication Data

US 2002/0193551 A1 Dec. 19, 2002

(51) Int. Cl.$^7$ .................. C08G 73/00; C08G 73/06

(52) U.S. Cl. ............... 528/422; 528/423; 528/486; 428/690; 428/917

(58) Field of Search .................. 528/422, 423, 528/486, 373; 428/690, 917; 544/1

(56) References Cited

U.S. PATENT DOCUMENTS

| | | | |
|---|---|---|---|
| 4,801,517 A | 1/1989 | Frechet et al. | |
| 4,818,650 A | 4/1989 | Limburg et al. | |
| 5,534,613 A | 7/1996 | Tan et al. | |
| 5,558,904 A | 9/1996 | Hsieh et al. | |
| 5,604,292 A | 2/1997 | Stenger-Smith et al. | |
| 5,708,130 A | 1/1998 | Woo et al. | |
| 5,723,671 A | 3/1998 | Goodbrand et al. | |
| 5,726,457 A | 3/1998 | Nakano et al. | |
| 5,777,070 A | 7/1998 | Inbasekaran et al. | |

(List continued on next page.)

FOREIGN PATENT DOCUMENTS

| WO | WO 98/27136 | 6/1998 |
|---|---|---|
| WO | WO 99/21936 | 5/1999 |
| WO | WO 02/26859 | 4/2002 |

OTHER PUBLICATIONS

Chang et al. (1998), "Dual–Color Polymer Light–Emitting Pixels Processed by Hybrid Ink–Jet Printing," *Applied Physics Letters* 73(18):2561–2563 (abstract only printed from *Chemical Abstracts* 130:45177).

(List continued on next page.)

*Primary Examiner*—Duc Truong
(74) *Attorney, Agent, or Firm*—Reed & Eberle LLP; Dianne E. Reed

(57) ABSTRACT

The invention provides conjugated polymers that have good solubility and semiconductivity, and that display high photoluminescent and electroluminescent efficiency. Representative polymers have the structure of formula (I):

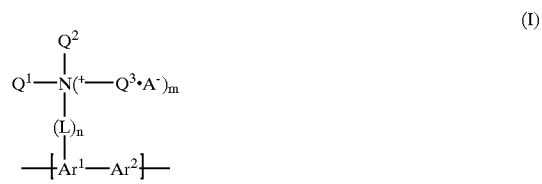

wherein: $Ar^1$ and $Ar^2$ are independently selected from the group consisting of monocyclic, bicyclic and polycyclic arylene, heteroarylene, substituted arylene and substituted heteroarylene groups; L is alkylene, alkenylene, substituted alkylene, substituted alkenylene, heteroalkylene, heteroalkenylene, substituted heteroalkylene, substituted heteroalkenylene, arylene, heteroarylene, substituted arylene or substituted heteroarylene; m is zero or 1; n is zero or 1; $Q^1$ and $Q^2$ are independently selected from the group consisting of H, aryl, heteroaryl, substituted aryl, substituted heteroaryl, alkyl, and substituted alkyl, and $Q^3$ is selected from the group consisting of alkyl and substituted alkyl, with the proviso that when m is 1, $Q^1$ and $Q^2$ are other than H; and $A^-$ is an anionic counterion such as a halide ion. Electroluminescent and other devices containing a polymer of the invention are also provided.

48 Claims, 1 Drawing Sheet

U.S. PATENT DOCUMENTS

| | | |
|---|---|---|
| 5,814,244 A | 9/1998 | Kreuder et al. |
| 5,900,327 A | 5/1999 | Pei et al. |
| 5,998,045 A | 12/1999 | Chen et al. |
| 6,087,467 A | 7/2000 | Marrocco, III et al. |
| 6,114,490 A | 9/2000 | Kreuder et al. |
| 6,169,163 B1 | 1/2001 | Woo et al. |

OTHER PUBLICATIONS

Chang et al. (1998), "Dual–Color Polymer Light–Emitting Pixels Processed by Hybrid InkJet Printing," Proceedings of SPIE—The International Society for Optical engineering, p. 3476 (abstract only printed from *Chemical Abstracts*, 130:359212).

Nothofer et al. (2000), "Liquid Crystalline Polyfluorenes for Blue Polarized Electroluminescence," Macromolecular Symposia 154: 139–148 (abstract only printed from *Chemical Abstracts 133*:141917).

Kraft et al. (1998), "Electroluminescent Conjugated Polymers–Seeing Polymers in a New Light," *Angew. Chem. Int. Ed.* 37:402–428.

Rehahn et al. (1989), "Soluble Poly(Para–Phenylene)s. 1. Extensions of the Yamamoto Synthesis to Dibromobenzenes Substituted with Flexible Side Chains," *Polymer* 30:1054–1059.

Yang et al. (1996), "Efficient Blue Polymer Light–Emitting Diodes from a Series of Soluble Poly(Paraphenylene)s," *J. Appl. Phys.* 79(2):934–939.

CONJUGATED ELECTROLUMINESCENT POLYMERS AND ASSOCIATED METHODS OF PREPARATION AND USE

REFERENCE TO GOVERNMENT SUPPORT

This invention was funded in part by the United States Office of Naval Research under Contract No. N00014-99-C-0274. The United States Government has certain rights in this invention.

TECHNICAL FIELD

This invention relates generally to the field of conjugated polymers, and more particularly relates to a novel class of conjugated electroluminescent polymers useful as semiconductive materials in electroluminescence devices and the like.

BACKGROUND

"Conjugated" polymers are polymers having a π-electron conjugated system along the main chain (or "backbone"), and have been known for some time to have utility as organic semiconducting materials. See, e.g., *Organic Conductors*, ch. 11, J. P. Farger, Ed. (New York, N.Y.: Marcel Dekker, 1994). Conjugated polymers include, for example, cis and trans polyacetylenes, polydiacetylenes, polyparaphenylenes, polypyrroles, polythiophenes, polybithiophenes, polyisothianaphthene, polyphenylenevinylenes, polythienylvinylenes, polyphenylenesulfide, and polyaniline. More recently, conjugated polymers have also been discovered to be useful as electroluminescent materials, i.e., as materials that emit light when excited by application of an electric current (Burroughs et al. (1990) *Nature* 347:539–541; May (1995) *Phys. World* 8(3):52–57). Accordingly, these polymers have been proposed for use in a variety of applications. For example, conjugated polymers may be used as the active material in semiconductor thin film devices such as light emitting diodes (LEDs), transistors, photodetectors and solar cells. Conjugated polymers may also be used in electrochemical devices such as rechargeable batteries and light emitting electrochemical cells (both as thin films and in solution), as electrochemical sensors, and as electrical conductors (after being heavily doped).

The most promising application for conjugated polymers is in electroluminescent displays. Red, green, and blue emissions from conjugated polymers have all been demonstrated. Currently, red and green polymer LEDs are sufficiently bright, efficient, and stable for a number of display applications, whereas blue polymer LEDs lag in power efficiency and lifetime. Blue light emitting polymers are for the most part based on poly(paraphenylene) (PPP) and poly(fluorene), which is itself a type of poly(paraphenylene) except that every two neighboring phenyl rings are locked in one plane. Other blue light emitting polymers include alkoxy-substituted PPP, as disclosed by Yang et al. (1996), "Efficient Blue Polymer Light-Emitting Diodes from a Series of Soluble Poly(paraphenylene)s," *J. Appl. Phys.* 79(2):934–939. Polyfluorenes with 9,9-dialkyl side groups are currently the best performing blue polymers, and are described, for example, in U.S. Pat. No. 5,900,327 to Pei et al. and U.S. Pat. No. 6,169,163 to Woo et al. Compared to red- and green-emitting polymers, however, blue-emitting polymers still lag in power efficiency (thus requiring a high operating voltage) and lifetime (i.e., the spectrum is not stable and tends to red-shift with time, heat, and operation). The problems stem from the dialkyl side groups, which reduce the polymers' glass transition temperature. The fluorene rings tend to aggregate, forming intraband defects that cause the color shift toward red.

There is accordingly a need in the art for blue-emitting polymers that have high blue luminescence, decreasing the required operating voltage for a blue polymer LED. Ideal polymers would also be conjugated, semiconductive polymers that are soluble in common organic solvents, particularly those used in semiconductor processing, but nevertheless retain semiconductivity, photoluminescence and electroluminescence efficiency, tensile strength, and thermal, chemical and photochemical stability. It would also be desirable to provide such polymers that may be easily modified so as to emit light in the red and green wavelength ranges.

SUMMARY OF THE INVENTION

The present invention is addressed to the aforementioned need in the art, and provides a novel family of conjugated polymers useful in a variety of applications, including fabrication of semiconductor thin film devices (e.g., LEDs, transistors, photodetectors and solar cells) and electrochemical devices (e.g., rechargeable batteries, light-emitting electrochemical cells, and electrochemical sensors).

It is another object of the invention to provide such polymers in the form of electroluminescent amino-substituted poly(paraphenylene) polymers, copolymers, and analogs thereof.

It is still another object of the invention to provide such polymers wherein the polymers are blue light emitting.

It is an additional object of the invention to provide electroluminescence devices containing a polymer of the invention as the electroluminescent material.

It is a further object of the invention to provide other types of semiconductor thin film devices and electrochemical devices fabricated with a polymer of the invention.

Additional objects, advantages and novel features of the invention will be set forth in part in the description which follows, and in part will become apparent to those skilled in the art upon examination of the following, or may be learned by practice of the invention.

In one embodiment, a conjugated electroluminescent polymer is provided containing monomer units having the general structure of formula (I)

wherein:
Ar$^1$ and Ar$^2$ are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene or substituted heteroarylene;

m is zero or 1;

n is zero or 1;

$Q^1$ and $Q^2$ are independently selected from the group consisting of H, aryl, heteroaryl, substituted aryl, substituted heteroaryl, alkyl, and substituted alkyl, and $Q^3$ is selected from the group consisting of alkyl and substituted alkyl, with the proviso that when m is 1, $Q^1$ and $Q^2$ are other than H; and $A^-$ is a negatively charged counterion.

It will be appreciated that given the definition of $Q^1$, $Q^2$, m, $Q^3$ and $A^-$, the amino-substituted conjugated polymer may be substituted with a primary amino group, a secondary amino group, a tertiary amino group, or a quaternary ammonium salt. Diarylamino substituents are preferred (wherein m is zero and $Q^1$ and $Q^2$ are aryl, heteroaryl, substituted aryl, or substituted heteroaryl), with diarylamino-substituted poly(paraphenylenes) and copolymers and analogs thereof particularly preferred.

In another embodiment, conjugated electroluminescent copolymers are provided conjugated electroluminescent copolymers are provided, containing at least one first monomer unit having the structure of formula (VI), (VII), (VIII) and/or (IX)

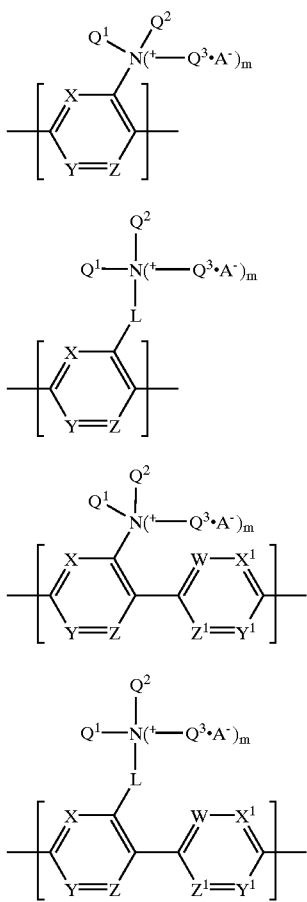

and at least one second monomer unit comprised of a vinylene unit or a monocyclic, bicyclic, or polycyclic arylene, heteroarylene, substituted arylene or substituted heteroarylene unit, wherein:

m, L, $Q^1$, $Q^2$, $Q^3$, and $A^-$ are as defined above; and

W, X, Y, Z, $X^1$, $Y^1$, and $Z^1$ are independently selected from the group consisting of N, CH, and $CR^1$, wherein $R^1$ is —$(L)_n$—$N(Q^1Q^2)$, —$(L)_n$—$N(Q^1Q^2Q^3)^+A^-$, —$NO_2$, sulfonic acid (—$SO_3H$), carboxylic acid (—COOH), phosphonic acid (—$O(PO)(OH)_2$), an organic or inorganic sulfonate, carboxylate or phosphonate salt, —CN, halo, $C_1$–$C_{20}$ hydrocarbyl, substituted $C_1$–$C_{20}$ hydrocarbyl, heteroatom-containing $C_1$–$C_{20}$ hydrocarbyl, or substituted heteroatom-containing $C_1$–$C_{20}$ hydrocarbyl, and further wherein Z and $Z^1$ may be linked to form a cyclic group.

In a further embodiment, electroluminescence devices are provided that contain a polymer of the invention as the electroluminescent material. These devices include light-emitting diodes (LEDs), photodetector devices, and light-emitting electrochemical cells. In a particularly preferred embodiment, an electroluminescence device prepared with a polymer of the invention is a cavity-emission electroluminescence device.

In an additional embodiment, other types of devices are provided that are fabricated with a polymer of the invention, particularly photovoltaic devices used for the generation of electrical power, electrochemical sensors used for detecting and/or quantitating chemical and/or biological materials, and transistors, e.g., field-effect transistors (FETs).

DETAILED DESCRIPTION OF THE INVENTION

Definitions

Figure 1:
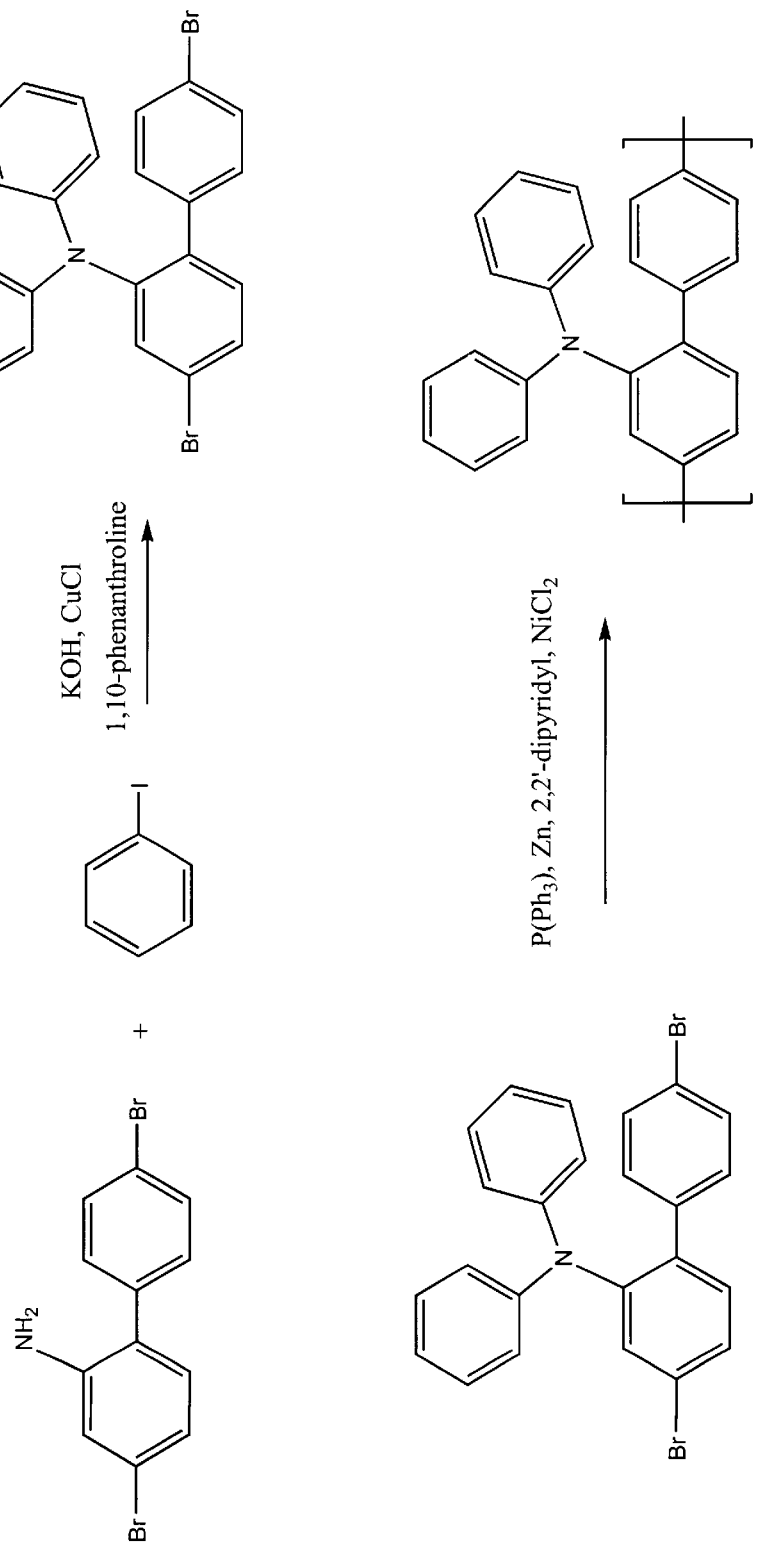
FIG. 1 schematically illustrates the preparation of the monomeric precursor 4,4'-dibromo-2-diphenylamino-1,1'-biphenyl as described in Example 1, followed by polymerization to give poly(2-diphenylamino-1,1'-biphenyl-4,4'-diyl as described in Example 4.

It is to be understood that unless otherwise indicated, this invention is not limited to specific starting materials, reagents or reaction conditions, as such may vary. It is also to be understood that the terminology used herein is for the purpose of describing particular embodiments only and is not intended to be limiting.

As used in this specification and the appended claims, the singular forms "a," "an" and "the" include plural referents unless the context clearly dictates otherwise. Thus, reference to "a monomer unit" includes combinations of different monomer units, "a polymer" includes mixtures of different polymers, and the like.

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different.

"Optional" or "optionally" means that the subsequently described event or circumstance may or may not occur, and that the description includes instances where said event or circumstance occurs and instances where it does not. For example, the phrase "optionally substituted aryl" means that an aryl moiety may or may not be substituted and that the description includes both unsubstituted aryl and aryl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, 2-ethylhexyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group of 2 to 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to 12 carbon atoms. The term "lower alkenyl" intends an alkenyl group of two to six carbon atoms, preferably two to four carbon atoms. The term "cycloalkenyl" intends a cyclic alkenyl group of three to eight, preferably five or six, carbon atoms.

The term "alkylene" as used herein refers to a difunctional branched or unbranched saturated hydrocarbon group of 1 to 24 carbon atoms, such as methylene, ethylene, n-propylene, n-butylene, n-hexylene, decylene, tetradecylene, hexadecylene, and the like. The term "lower alkylene" refers to an alkylene group of one to six carbon atoms, preferably one to four carbon atoms.

The term "alkenylene" as used herein refers to a difunctional branched or unbranched hydrocarbon group of 2 to 24 carbon atoms containing at least one double bond, such as ethenylene, n-propenylene, n-butenylene, n-hexenylene, and the like. The term "lower alkenylene" refers to an alkylene group of two to six carbon atoms, preferably two to four carbon atoms.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing one to six, more preferably one to four, carbon atoms.

The term "aryl" as used herein, and unless otherwise specified, refers to a univalent aromatic substituent containing a single aromatic ring or multiple aromatic rings that are fused together or linked covalently. Preferred aryl groups contain one aromatic ring, two fused or linked aromatic rings, or three fused rings, at least two of which are aromatic, e.g., phenyl, naphthyl, biphenyl, fluorenyl, and the like. "Substituted aryl" refers to an aryl moiety substituted with one or more substituent groups, and the terms "heteroatom-containing aryl" and "heteroaryl" refer to aryl in which at least one carbon atom is replaced with a heteroatom.

The term "arylene" as used herein, and unless otherwise specified, refers to a divalent aromatic substituent containing a single aromatic ring or multiple aromatic rings that are fused together or linked covalently. Preferred arylene groups contain one aromatic ring, two fused or linked aromatic rings, or three fused rings, at least two of which are aromatic. "Substituted arylene" refers to an arylene moiety substituted with one or more substituent groups, and the terms "heteroatom-containing arylene" and "heteroarylene" refer to arylene in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" are used in the conventional sense to refer to a chloro, bromo, fluoro or iodo substituent. The terms "haloalkyl," "haloalkenyl" or "haloalkynyl" (or "halogenated alkyl," "halogenated alkenyl," "halogenated aromatic" or "halogenated alkynyl") refers to an alkyl, alkenyl, aromatic or alkynyl group, respectively, in which at least one of the hydrogen atoms in the group has been replaced with a halogen atom.

The term "heteroatom-containing" refers to a molecule or molecular fragment in which one or more carbon atoms is replaced with an atom other than carbon, e.g., nitrogen, oxygen, sulfur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like.

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. The term "hydrocarbylene" intends a divalent hydrocarbyl moiety containing 1 to about 30 carbon atoms, preferably 1 to about 24 carbon atoms, most preferably 1 to about 12 carbon atoms, including branched or unbranched, saturated or unsaturated species, or the like. The term "lower hydrocarbylene" intends a hydrocarbylene group of one to six carbon atoms, preferably one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom.

The term "polyether" as in a "polyether substituent" refers to an alkyl substituent containing two or more ether linkages. Such substituents include, by way of example, the moiety —$(CH_2)_x(OCH_2CH_2)_yOR^e$ wherein x is zero, 1 or 2, y is generally 1 to 12, preferably 1 to 6, most preferably 1 to 3, and $R^e$ is alkyl, preferably lower alkyl such as methyl or ethyl.

The term "conjugated" refers to a polymer having a π-electron conjugated system along the main chain (or "backbone"), and includes polymers that have discrete conjugated segments as well as polymers that are completely conjugated.

The term "analog" as in an "analog" of poly(paraphenylene) refers to a poly(paraphenylene) in which one or more of the ring carbon atoms in the phenylene units is replaced with a nitrogen atom or substituted with a non-hydrogen substituent.

By "substituted" as in "substituted hydrocarbyl," "substituted hydrocarbylene," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are functional groups such as hydroxyl, alkoxy, thio, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl." Further, when other adjectives appear prior to a list of elements, it is intended that those terms apply to every member of the list.

The Noval Polymers

The polymers of the invention are conjugated polymers having the general structure of formula (I)

wherein:
- $Ar^1$ and $Ar^2$ are independently selected from the group consisting of monocyclic, bicyclic and polycyclic arylene, heteroarylene, substituted arylene and substituted heteroarylene groups;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene or substituted heteroarylene;
- m is zero or 1;
- n is zero or 1;
- $Q^1$ and $Q^2$ are independently selected from the group consisting of H, aryl, heteroaryl, substituted aryl, substituted heteroaryl, alkyl, and substituted alkyl, and $Q^3$ is selected from the group consisting of alkyl and substituted alkyl, with the proviso that when m is 1, $Q^1$ and $Q^2$ are other than H; and
- $A^-$ is a negatively charged counterion, e.g., a halide ion, an oxyanion (such as nitrate, sulfate, phosphate, carbonate, bromate, chlorate, or iodate) or cyanide ($CN^-$).

$Ar^1$ and $Ar^2$ may be a five-membered or six-membered arylene, heteroarylene, substituted arylene or substituted heteroarylene group, or may contain one to five, typically one to three such groups, either fused or linked. Preferably, $Ar^1$ and $Ar^2$ are comprised of one or two aromatic rings. $Ar^1$ and $Ar^2$, and $Q^1$ and $Q^2$ (when other than H) and/or $Q^3$, may be substituted with one or more substituents that do not adversely affect the electroluminescent properties of the polymer, and that, ideally, enhance copolymer properties such as solubility and processability. In preferred polymers herein, however, $Ar^1$, $A^2$, $Q^1$, $Q^2$ and $Q^3$ are not substituted. For polymers in which $Ar^1$, $Ar^2$, $Q^1$, $Q^2$ and/or $Q^3$ are substituted, examples of suitable substituents include:
- $—(L)_n—N(Q^1Q^2)$ wherein L, n, $Q^1$ and $Q^2$ are as defined above;
- $—(L)_n—N(Q^1Q^2Q^3)^+A^-$ wherein L, n, $Q^1$, $Q^2$, $Q^3$ and $A^-$ are as defined above;
- $C_1$–$C_{20}$ hydrocarbyl including, but not limited to, $C_1$–$C_{20}$ alkyl, $C_2$–$C_{20}$ alkenyl and $C_5$–$C_{20}$ aryl;
- substituted $C_1$–$C_{20}$ hydrocarbyl including, by way of example, halo- (preferably fluoro- or chloro-, including perfluoro-), cyano-, hydroxyl, $C_1$–$C_{20}$ alkoxy- and carboxyl-substituted $C_1$–$C_{20}$ hydrocarbyl, and $C_1$–$C_{20}$ hydrocarbyl substituted with $—SO_3H$, $—COOH$, or $—O(PO)(OH)_2$ or with an organic or inorganic salt thereof (e.g., a metal salt such as a sodium or potassium sulfonate, carboxylate or phosphonate);
- heteroatom-containing $C_1$–$C_{20}$ hydrocarbyl including, but not limited to, $C_1$–$C_{20}$ alkoxy, $C_1$–$C_{20}$ (thio)alkoxy, $C_5$–$C_{20}$ (thio)aryloxy, and polyether substituents;
- substituted heteroatom-containing $C_1$–$C_{20}$ hydrocarbyl such as $C_1$–$C_{20}$ alkoxycarbonyl, $C_5$–$C_{20}$ aryloxylcarbonyl, $C_1$–$C_{20}$ carboxyl, and halo-substituted polyether substituents;
- halo (with fluoro and chloro preferred);
- cyano;
- nitro;
- $—SO_3H$;
- $—COOH$;
- $—O(PO)(OH)_2$); and
- organic and inorganic sulfonate, carboxylate and phosphonate salts.

Examples of suitable $Ar^1$ and $Ar^2$ moieties thus include, but are not limited to, the following:

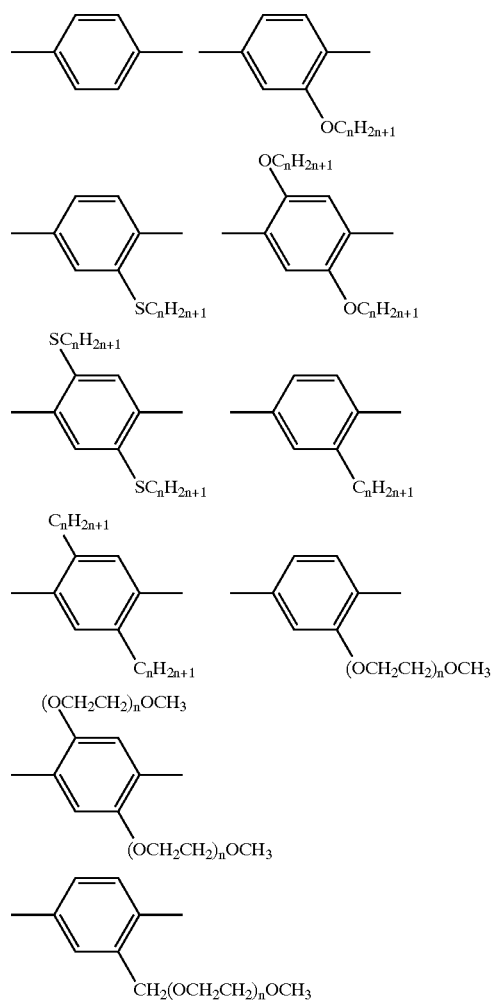

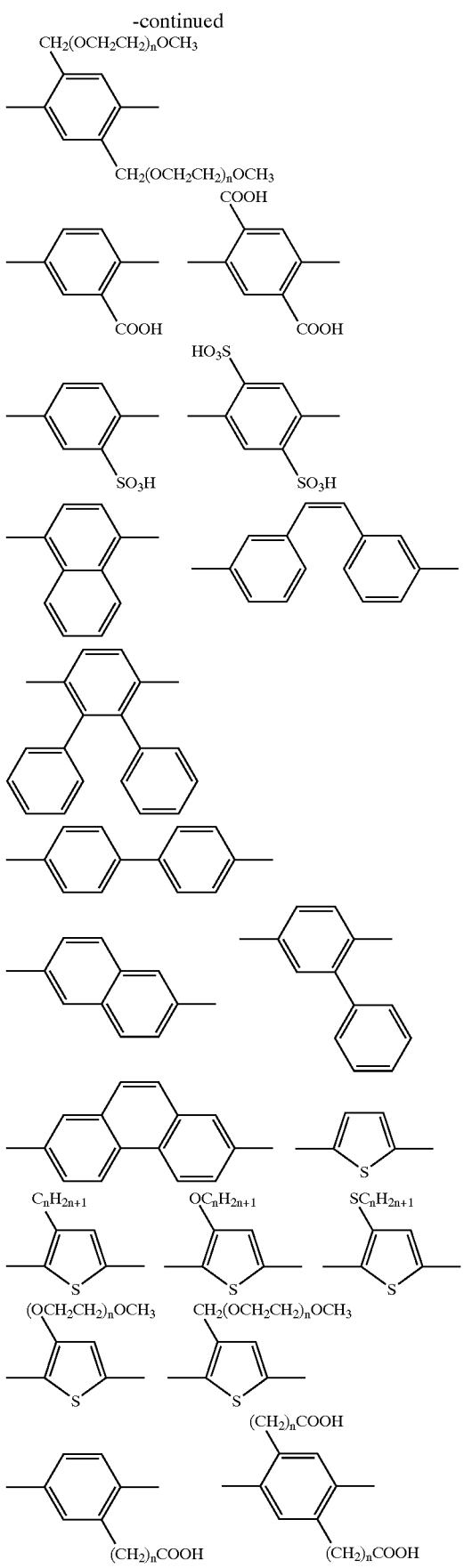
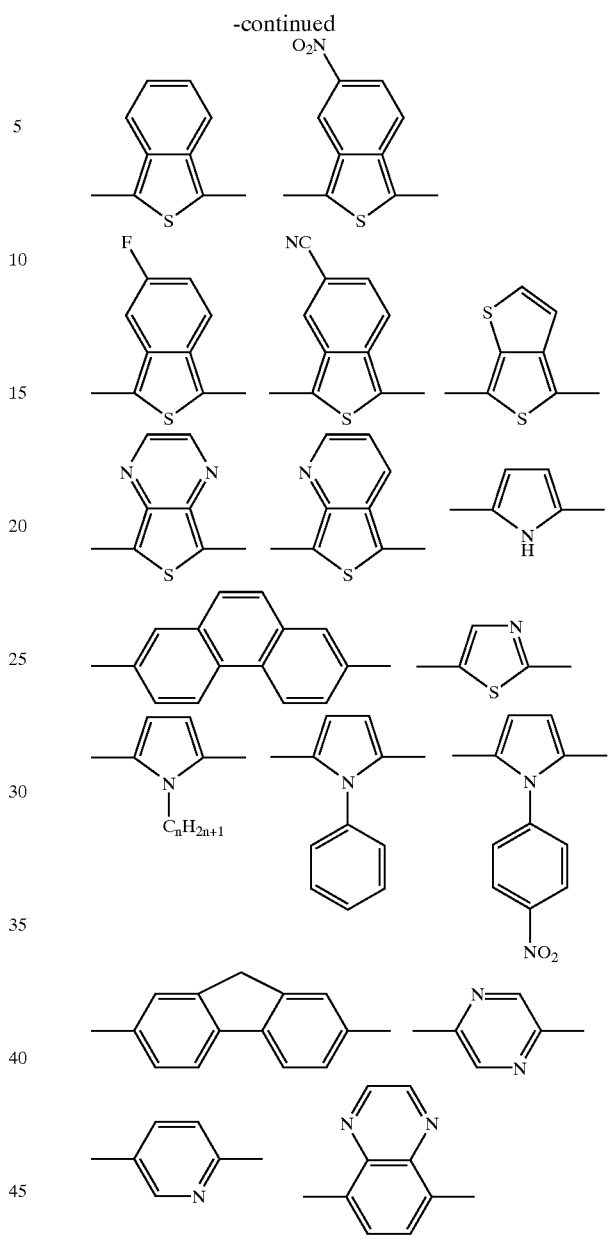
In the above structures, n is generally in the range of 1 to 12 inclusive. Preferred polymers within the aforementioned group are electroluminescent.
Preferred polymers of formula (I) have the structure of formula (II)
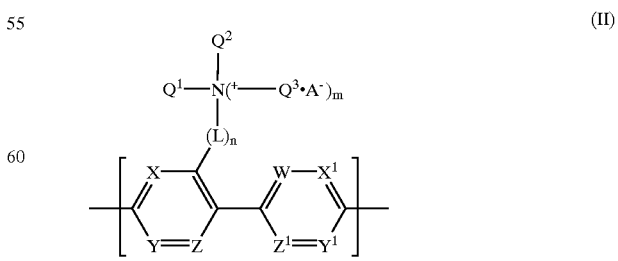
wherein m, n, L, $Q^1$, $Q^2$, $Q^3$ and $A^-$ are as defined for formula (I), and W, X, Y, Z, $X^1$, $Y^1$, and $Z^1$ are independently selected from the group consisting of N, CH, and CR$^1$, wherein R$^1$ is selected from the group consisting of: —(L)$_n$—N(Q$^1$Q$^2$); —(L)$_n$—N(Q$^1$Q$^2$Q$^3$)$^+$A$^-$; C$_{1-20}$ hydrocarbyl including, but not limited to, C$_1$–C$_{20}$ alkyl, C$_2$–C$_{20}$ alkenyl and C$_5$–C$_{20}$ aryl; substituted C$_1$–C$_{20}$ hydrocarbyl including, by way of example, halo- (preferably fluoro- or chloro-, including perfluoro-), cyano-, hydroxyl, C$_1$–C$_{20}$alkoxy- and carboxyl-substituted C$_1$–C$_{20}$ hydrocarbyl, and C$_1$–C$_{20}$ hydrocarbyl substituted with —SO$_3$, —COOH, or —O(PO)(OH)$_2$ or with an or ganic or inorganic salt thereof (e.g., a metal salt such as sodium or potassium sulfonate, carboxylate or phosphonate); heteroatom-containing C$_1$–C$_{20}$ hydrocarbyl including, but not limited to, C$_1$–C$_{20}$ alkoxy, C$_1$–C$_{20}$ (thio)alkoxy, C$_5$–C$_{20}$ (thio)aryloxy, and polyether substituents; substituted heteroatom-containing C$_1$–C$_{20}$ hydrocarbyl such as C$_1$–C$_{20}$ alkoxycarbonyl, C$_1$–C$_{20}$ aryloxylcarbonyl, C$_1$–C$_{20}$ carboxyl, and halo-substituted polyether substituents; halo (with fluoro and chloro preferred); cyano; nitro; —SO$_3$H; —COOH; —O(PO)(OH)$_2$; and organic and inorganic salts of sulfonic acid, carboxylic acid and phosphonic acid groups, as above; or wherein the Z and Z$^1$ moieties may be linked to form a cyclic group. It will be appreciated that when W, X, Y, Z, X$^1$, Y$^1$, and Z$^1$ are all CH, the monomer unit shown represents a monomer unit of a poly (paraphenylene) polymer or copolymer. Further, when at least one of X, Y and Z (or W, X$^1$, Y$^1$, and Z$^1$) is N, the aromatic ring will be, for example, substituted or unsubstituted pyridinyl, pyridazinyl, pyrimidinyl, pyrazinyl, 1,2,4-triazinyl, or 1,2,3-triazinyl.

In a particularly preferred embodiment, the aforementioned polymers have the structure of formula (III)

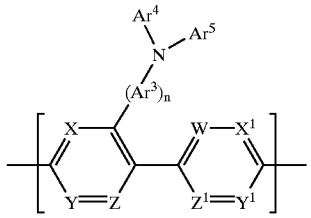

(III)

In formula (III), Ar$^3$ is arylene, heteroarylene, substituted arylene or substituted heteroarylene containing one to three aromatic rings. If present (i.e., when n is 1), Ar$^3$ is preferably phenylene.

Ar$^4$ and Ar$^5$ are independently selected from the group consisting of aryl, heteroaryl, substituted aryl and substituted heteroaryl containing one or two aromatic rings. Ar$^4$ and Ar$^5$ are preferably unsubstituted. However, if Ar$^4$ and/or Ar$^5$ are substituted, preferred substituents are C$_1$–C$_{12}$ alkyl, fluorinated (including perfluorinated ) C$_1$–C$_{12}$ alkyl, C$_1$–C$_{12}$ alkoxy, fluoro, cyano, nitro, and inorganic salts, preferably metal salts, of sulfonic acid, carboxylic acid and phosphonic acid groups, and particularly preferred substituents are lower alkyl, fluorinated (including perfluorinated) lower alkyl, lower alkoxy, fluoro, cyano, nitro, and alkali metal (e.g., Na$^+$, K$^+$) of sulfonic acid groups.

W, X, Y, Z, X$^1$, Y$^1$, and Z$^1$ are independently selected from the group consisting of N, CH, and CR$^1$, wherein R$^1$ is selected from the group consisting of: —(Ar$^3$)$_n$— NAr$^4$Ar$^5$ wherein Ar$^3$, n, Ar$^4$ and Ar$^5$ are as defined above; C$_1$–C$_{12}$ alkyl; fluorinated (including perfluorinated) C$_1$–C$_{12}$ alkyl; C$_1$–C$_{12}$ alkoxy; fluoro; cyano; nitro; —SO$_3$H; —COOH; —O(PO)(OH)$_2$; and organic and inorganic salts of sulfonic acid, carboxylic acid and phosphonic acid groups; or Z and Z$^1$ may be linked to form cyclic group so as to form a three-ring compound having the structure (IV)

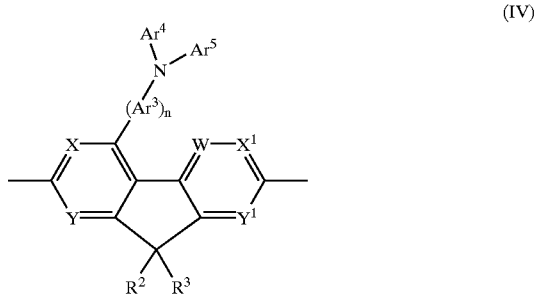

(IV)

in which R$^2$ and R$^3$ are independently selected from the group consisting of hydrogen, alkyl, substituted alkyl, heteroatom-containing alkyl, and substituted heteroatom-containing alkyl. R$^2$ and R$^3$ are preferably selected from the group consisting of: hydrogen; linear or branched alkyl substituents containing 4 to 12 carbon atoms; cyano-substituted alkyl substituents containing 1 or 2 cyano groups on a 4 to 10 carbon atom linear or branched alkyl group; and polyether substituents containing 2 to 5 ether oxygen atoms separated from one another by 1, 2 or 3 carbon alkylene bridges.

In this embodiment, the most preferred polymers are wherein n is zero, Ar$^4$ and Ar$^5$ are both phenyl optionally substituted lower alkyl, lower alkoxy, fluoro, cyano, nitro, sulfonate and/or carboxylate groups, and the backbone aromatic moieties are either unsubstituted or substituted with an additional —N(Ar$^4$Ar$^5$) group. Polar groups such as sulfonate and carboxylate, as will be appreciated by those of skill in the art, increase the aqueous solubility of the polymer, and may therefore be preferred substituents for Ar$^4$ and Ar$^5$ as well as preferred R$^1$ moieties, when enhanced solubility is desired. An exemplary polymer of this type has the structure of formula (V), wherein the R moieties may be the same or different and are selected from the group consisting of lower alkyl, lower alkoxy, fluoro, cyano, nitro, and/or sulfonate groups, and p and q are independently integers in the range of zero to 5, typically in the range of zero to 2.

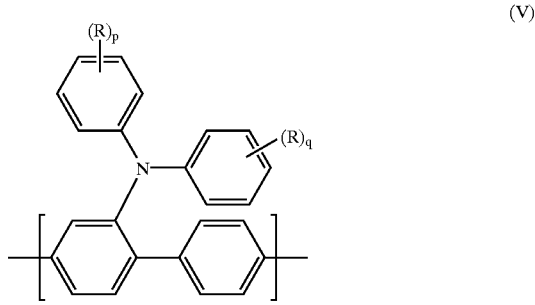

(V)

Such polymers include those having the structure (Va) as well as those having the structure (Vb):

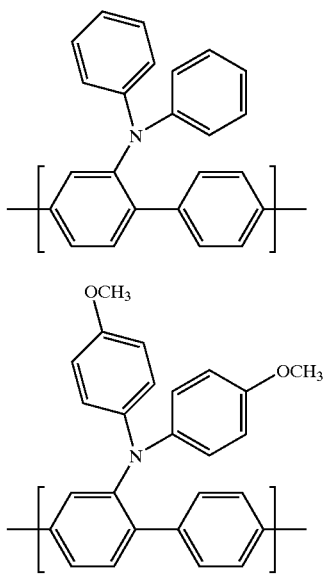

(Va)

(Vb)

In another embodiment of the invention, conjugated copolymers are provided, containing at least one first monomer unit having the structure of formula (VI), (VII), (VIII) and/or (IX)

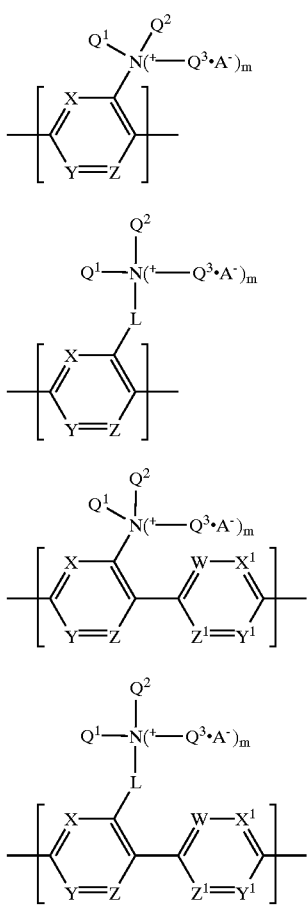

(VI)

(VII)

(VIII)

(IX)

and at least one second monomer unit comprised of a vinylene unit or a monocyclic, bicyclic, or polycyclic arylene, heteroarylene, substituted arylene or substituted heteroarylene unit, wherein:

L is alkylene, alkenylene, substituted alkylene, substituted alkenylene, heteroalkylene, heteroalkenylene, substituted heteroalkylene, substituted heteroalkenylene, arylene, heteroarylene, substituted arylene or substituted heteroarylene;

m is zero or 1;

$Q^1$ and $Q^2$ are independently selected from the group consisting of H, aryl, heteroaryl, substituted aryl, substituted heteroaryl, alkyl, and substituted alkyl, and $Q^3$ is selected from the group consisting of alkyl and substituted alkyl, with the proviso that when m is 1, $Q^1$ and $Q^2$ are other than H; and W, X, Y, Z, $X^1$, $Y^1$, and $Z^1$ are independently selected from the group consisting of N, CH, and $CR^1$, wherein $R^1$ is selected from the group consisting of: $—(L)_n—N(Q^1Q^2)$; $—(L)_n—N(Q^1Q^2Q^3)^-A^-$; $C_1-C_{20}$ hydrocarbyl including, but not limited to, $C_1-C_{20}$ alkyl, $C_2-C_{20}$ alkenyl and $C_5-C_{20}$ aryl; substituted $C_1-C_{20}$ hydrocarbyl including, by way of example, halo- (preferably fluoro- or chloro-, including perfluoro-), cyano-, hydroxyl, $C_1-C_{20}$ alkoxy- and carboxyl-substituted $C_1-C_{20}$ hydrocarbyl, and $C_1-C_{20}$ hydrocarbyl substituted with $—SO_3H$, $—COOH$, or $—O(PO)(OH)_2$ or with an organic or inorganic salt thereof (e.g., a metal salt such as a sodium or potassium sulfonate, carboxylate or phosphonate); heteroatom-containing $C_1-C_{20}$ hydrocarbyl including, but not limited to, $C_1-C_{20}$ alkoxy, $C_1-C_{20}$ (thio)alkoxy, $C_1-C_{20}$ (thio)aryloxy, and polyether substituents; substituted heteroatom-containing $C_1-C_{20}$ hydrocarbyl such as $C_1-C_{20}$ alkoxycarbonyl, $C_1-C_{20}$ aryloxylcarbonyl, $C_1-C_{20}$ carboxyl, and halo-substituted polyether substituents; halo (with fluoro and chloro preferred); cyano; nitro; $—SO_3H$; $—COOH$; $—O(PO)(OH)_2$; and organic and inorganic salts of sulfonic acid, carboxylic acid and phosphonic acid groups, as above; and further wherein Z and $Z^1$ may be linked to form a cyclic group. It will be appreciated from structures (VI) and (VII) that these copolymers are not necessarily analogs of poly (paraphenylene).

Preferred such copolymers are electroluminescent copolymers, and contain at least one first monomer unit having the structure of formula (X), (XI), (XII) and/or (XIII)

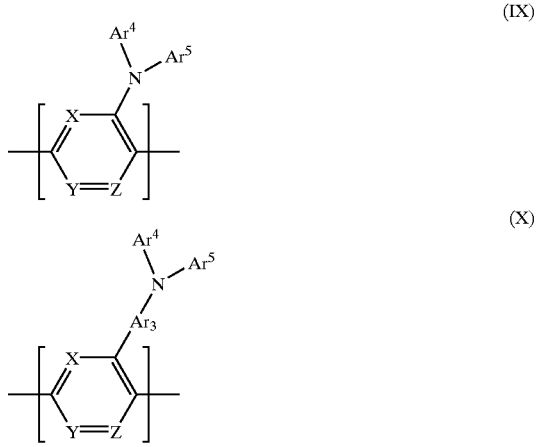

(IX)

(X)

-continued

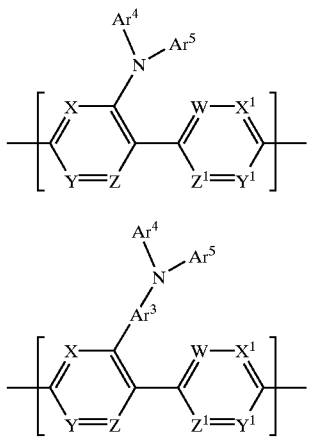

and at least one second monomer unit comprised of a vinylene unit or a monocyclic, bicyclic, or polycyclic arylene, heteroarylene, substituted arylene or substituted heteroarylene unit. In the above structural formulae, the following definitions apply.

$Ar^3$ is arylene, heteroarylene, substituted arylene or substituted heteroarylene containing one to three aromatic rings. If $Ar^3$ is present (i.e., in structures (X) and (XII)), it is preferably unsubstituted phenylene.

$Ar^4$ and $Ar^5$ are independently selected from the group consisting of aryl, heteroaryl, substituted aryl and substituted heteroaryl containing one or two aromatic rings. Preferably, $Ar^4$ and $Ar^5$ are unsubstituted. If $Ar^4$ and/or $Ar^5$ are substituted, preferred substituents are $C_1$–$C_{12}$ alkyl, fluorinated (including perfluorinated) $C_1$–$C_{12}$ alkyl, $C_1$–$C_{12}$ alkoxy, fluoro, cyano, nitro, and inorganic salts, preferably metal salts, of sulfonic acid, carboxylic acid and phosphonic acid groups, and particularly preferred substituents are lower alkyl, fluorinated (including perfluorinated) lower alkyl, lower alkoxy, fluoro, cyano, nitro, and alkali metal (e.g., $Na^+$, $K^+$) of sulfonic acid groups.

W, X, Y, Z, $X^1$, $Y^1$, and $Z^1$ are independently selected from the group consisting of N, CH, and $CR^1$, wherein $R^1$ is selected from the group consisting of: —$(Ar^3)_n$—$NAr^4Ar^5$ wherein $Ar^3$, n, $Ar^4$ and $Ar^5$ are as defined above; $C_1$–$C_{12}$ alkyl; fluorinated (including perfluorinated) $C_1$–$C_{12}$ alkyl; $C_1$–$C_{12}$ alkoxy; fluoro; cyano; nitro; —$SO_3H$; —COOH; —$O(PO)(OH)_2$; and organic and inorganic salts of sulfonic acid, carboxylic acid and phosphonic acid groups; or Z and $Z^1$ may be linked to form cyclic group so as to form a three-ring compound having the structure (IV)

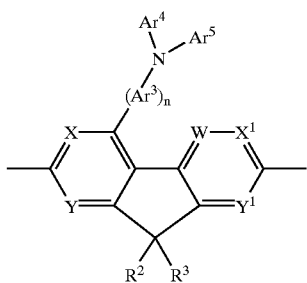

in which $R^2$ and $R^3$ are independently selected from the group consisting of hydrogen, alkyl, substituted alkyl, heteroatom-containing alkyl, and substituted heteroatom-containing alkyl.

The additional monomer unit comprises a vinylene and/or an aromatic species, and is selected from the group consisting of vinylene, arylene, heteroatom-containing arylene, substituted arylene, substituted heteroatom-containing arylene, and combinations thereof. The aromatic species may be monocyclic, bicyclic or polycyclic, including fused and linked bicyclic and polycyclic.

One such additional monomer unit is a fluorenyl moiety optionally 9,9-disubstituted with linear or branched alkyl substituents containing 4 to 10 carbon atoms, cyano-substituted alkyl substituents containing 1 or 2 cyano groups on a 4 to 10 carbon atom linear or branched alkyl group, or polyether substituents containing 2 to 5 ether oxygen atoms separated from one another by 1, 2 or 3 carbon alkylene bridges. Such monomer units have the structure (XIV)

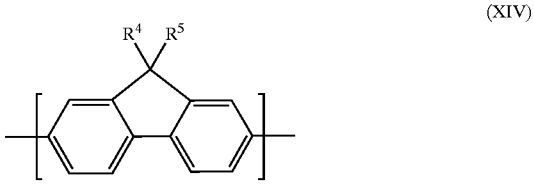

wherein $R^4$ and $R^5$ are H or represent the aforementioned substituents at the 9-position. Accordingly, an exemplary copolymer containing this type of monomer unit has the structure of formula (XV)

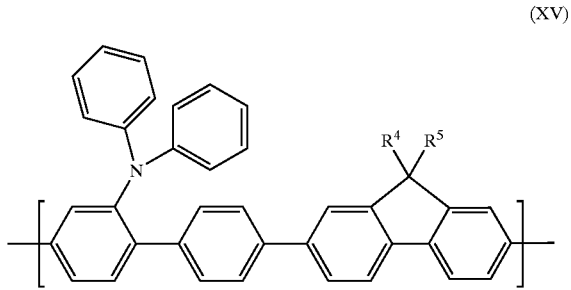

Another type of additional monomer unit is a phenylene vinylene monomer unit, either unsubstituted or substituted as described in co-pending U.S. patent application Ser. No. 09/619,372, filed Jul. 19, 2000, published through the PCT on Jan. 25, 2001 as WO 01/05863. Such monomer units will generally have the structure of formula (XVI)

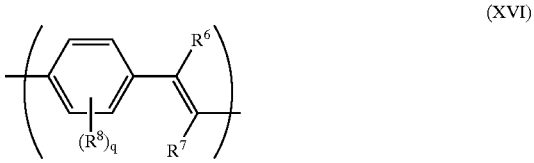

wherein the substituents $R^6$ and $R^7$ are generally H but may also be halo (particularly chloro or fluoro) cyano, substituted or unsubstituted $C_1$–$C_{20}$, preferably $C_1$–$C_{12}$, alkyl or alkoxy, substituted or unsubstituted $C_2$–$C_{20}$, preferably $C_2$–$C_{12}$, alkenyl or alkynyl, and substituted or unsubstituted $C_5$–$C_{20}$, preferably $C_5$–$C_{12}$, aryl or heteroaryl. Alternatively, $R^6$ and $R^7$ may together form an additional bond, such that a triple bond connects the two carbon atoms shown. $R^8$ is halo, cyano, alkyl ($C_1$–$C_{20}$, preferably $C_1$–$C_{12}$), substituted alkyl ($C_1$–$C_{20}$, preferably $C_1$–$C_{12}$), heteroatom-containing alkyl (e.g., alkoxy, substituted alkoxy, or polyether; again, generally $C_1$–$C_{20}$, preferably $C_1$–$C_{12}$), aryl ($C_5$–$C_{20}$, preferably $C_5$–$C_{12}$), heteroaryl ($C_5$–$C_{20}$, preferably $C_5$–$C_{12}$), substituted aryl ($C_5$–$C_{20}$, preferably $C_5$–$C_{12}$), or substituted heteroaryl ($C_5$–$C_{20}$, preferably $C_5$–$C_{12}$), and q is an integer in the range of zero to 4 inclusive. When q is 2 or more, two $R^8$ moieties on adjacent carbon atoms may be linked to form an additional cyclic group.

The additional monomer unit may also have the structure (XVII)

(XVII)

wherein x is zero or 1 and $M^1$ and $M^2$ are independently selected from the group consisting of: cyclopentadiene; five-membered heterocycles containing one, two or three heteroatoms selected from S, O and N; and six-membered heterocycles containing one, two, three or four heteroatoms selected from S, O and N, wherein either $M^1$, $M^2$ or both are optionally substituted with one or two substituents selected from alkyl, alkoxy, nitro, sulfonic acid groups, and —$(Ar^3)_n$—$N(Ar^4Ar^5)$ moieties. Preferred additional monomer units of this type are wherein x is zero and $M^1$ and $M^2$ are thiophene, either unsubstituted or substituted with one to five —$(Ar^3)_n$—$N(Ar^4Ar^5)$, $C_{1-20}$ alkyl, or $C_{1-20}$ alkoxy substituents, typically with one or two —$(Ar^3)_n$—N($Ar^4Ar^5$), $C_{1-12}$ alkyl, or $C_{1-12}$ alkoxy substituents, and preferably with one or two $C_{1-12}$ alkyl or $C_{1-12}$ alkoxy substituents. Exemplary copolymers containing monomer unit (XVII) have the structure (XVIII)

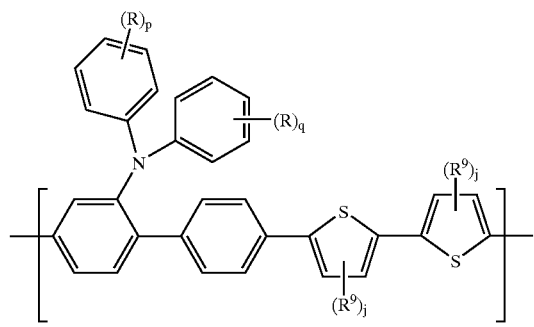
(XVIII)

and related copolymers have the structure (XIX)

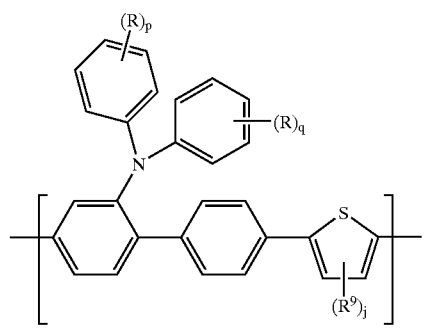
(XIX)

wherein p and q are independently integers in the range of zero to 5 inclusive, the R substituents may be the same or different and are selected from the group consisting of lower alkyl, lower alkoxy, fluoro, cyano, nitro, and sulfonate, j is zero, 1 or 2, preferably zero or 1, and $R^9$ is —$(Ar^3)_n$—N ($Ar^4Ar^5$) (wherein $Ar^3$, n, $Ar^4$ and $Ar^5$ are as defined previously), $C_1$–$C_{20}$ alkyl or $C_1$–$C_{20}$ alkoxy, preferably —$(Ar^3)_n$—$NAr^4Ar^5$, $C_1$–$C_{12}$ alkyl or $C_1$–$C_{12}$ alkoxy, and most preferably $C_{1-12}$ alkyl or $C_1$–$C_{12}$ alkoxy. Additional related copolymers contain para-methoxy substituents on each phenyl ring of the diphenylamino substituent; such copolymers have the structure (XX):

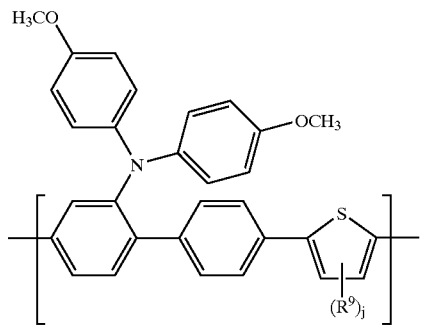
(XX)

The additional monomer unit or units are generally comprised of a $C_5$–$C_{30}$, preferably $C_5$–$C_{20}$, mononuclear, binuclear, or polynuclear aromatic hydrocarbon unit, or a $C_5$–$C_{20}$, preferably $C_5$–$C_{12}$ mononuclear, binuclear, or polynuclear heterocyclic unit. In addition to the above, then, examples of other aromatic moieties suitable as the additional monomer unit(s) include, but are not limited to: the aromatic hydrocarbons naphthalene, acenaphthene, phenanthrene, anthracene, fluoranthene, pyrene, rubrene, and chrysene; heterocycles such as faran, thiophene, pyrrole, oxazole, isooxazole, thiazole, isothiazole, imidazole, oxadiazoles, thiadiazole, pyrazoles, pyridine, pyridazine, pyrimidine, pyrazine, triazines, and tetrazenes; benzo-fused ring systems such as benzoxazole, benzothiazole, benzimidazole, quinoline, isoquinoline, cinnoline, quinazoline, quinoxaline, phthalazine, benzothiadiazole, and benzotriazines; and polynuclear condensed ring systems such as phenazine, phenanthridine, acridine, carbazole, and diphenylene oxide. Like the first monomer unit, the second monomer unit is optionally substituted with one or more substituents that do not adversely affect the electroluminescent properties of the copolymer, and that, ideally, enhance copolymer properties such as solubility and processability. Examples of substituents include those moieties encompassed by the definition of $R^1$, as above.

The copolymer may be a random copolymer, an alternating copolymer, or a block copolymer. With alternating copolymers, having the structure -[$M^1$–$M^2$]-, wherein $M^1$ and $M^2$ represent the first monomer unit and the second monomer unit, respectively, the molar ratio of the two monomer units is 50:50. With random copolymers and block copolymers, the molar ratio of the different monomer units in the copolymer is not critical; generally, however, with a copolymer containing a first monomer unit having the structure of (VI), (VII), (VIII) or (IX) and a second monomer unit, the ratio of the first monomer unit to the second monomer unit will be in the range of about 20:80 to about 99:1.

The polymers of the invention exhibit a number of advantageous properties. In particular, the polymers:

display good semiconductivity, particularly hole mobility;

exhibit high photoluminescent and electroluminescent efficiency, in the range of 20–100%;

are quite soluble in organic solvents, presumably since the pendant amino groups tend to effect separation of the conjugated polymer chains from one another;

display good aqueous solubility when substituted with polar groups such as sulfonate and carboxylate groups;

form high quality thin films and fibers; and exhibit high thermal, chemical and photochemical stability.

Furthermore, those polymers comprising a poly (paraphenylene) backbone are blue light emitting, and display high photoluminescent and electroluminescent efficiency, i.e., in the range of 20–100%, as mentioned above. Minor modifications to the molecular structure of the blue-emitting polymers can be made so that light of a different wavelength is emitted, e.g., green rather than blue light.

Although the polymers are primarily useful as soluble, semiconductive polymers that emit blue light, it may be desirable to modify the polymers so as to shift the emission wavelength so that light of a different color is emitted as alluded to above. A wavelength shift may be readily achieved by introducing various side chains into the polymer and/or incorporating co-monomers that emit light in a different wavelength range. For example, as will be shown in Example 8, poly(2-diphenylamino-1,1'-biphenyl-4,4'-diyl emits blue light, but when 4-methoxyphenyl is substituted for phenyl in the diphenylamino group, the polymer emits green light. As another example, polythiophenes substituted at the 3-position with a $C_6$–$C_{12}$ alkyl group may be incorporated into a copolymer so as to provide emission of red light. See, for example, Kraft (1998) *Angew. Chem. Int. Ed.* 37:402–428.

The polymers may in some embodiments be comprised of conjugated segments separated by nonconjugated linkages, e.g., linking groups such as methylene, ethylene, methoxyethylene, ethylene oxide, propylene oxide, and the like. Incorporating a high concentration of interruptions in an otherwise conjugated polymer chain can also shift the wavelength of emitted light. (With PPV, for example, it has been established that incorporation of substituted ethylene units in place of PPV's vinyl units can result shifting PPV's green emission into the blue-green range; see Kraft, supra.)

Other substituents, comonomers and linkages useful for effecting a wavelength shift and thereby changing the color of emitted light can be readily determined by one of skill in the art by reference to the pertinent texts and literature or by using routine experimentation.

Typically, the number average molecular weight of the polymers is in the range of approximately 1000 to 2,000,000, with preferred polymers having a number average molecular weight in the range of about 5000 to 1,000,000, and particularly preferred polymers having a number average molecular weight in the range of approximately 10,000 to 500,000. It will be appreciated that molecular weight can be varied to optimize polymer properties. For example, lower molecular weight is preferred to ensure solubility, while a higher molecular weight is generally necessary to provide for advantageous electrical and film-forming properties.

The invention additionally pertains to polymer blends containing one or more polymers of the invention as described above, and at least one additional polymer. For example, conductive blends may be prepared with at least one additional conjugated polymer, with the molar ratio of the polymers in the blend selected to maximize electroluminescence efficiency. Suitable additional conjugated polymers include, for example, cis and trans polyacetylenes, polydiacetylenes, polypyrroles, polythiophenes, polybithiophenes, polyisothianaphthene, polythienylvinylenes, polyphenylenesulfide, polyaniline, polyphenylenevinylenes, and polyphenylenevinylene derivatives, e.g., poly(2-methoxy-5-(2-ethylhexyloxy)-1,4-phenylene vinylene) ("MEH-PPV") (see U.S. Pat. No. 5,189,136 to Wudl et al.), poly (2,5-bischelostanoxy-1,4-phenylene vinylene) ("BCHA-PPV") (e.g., as described in International Patent Publication No. WO 98/27136), poly (2-N,N-dimethylamino phenylene vinylene) (described in U.S. Pat. No. 5,604,292 to Stenger-Smith et al.), and polythienylvinylenes.

Polymerization

The polymers of the invention are generally synthesized by polymerizing monomers having the structure of formula (XXI)

(XXI)

wherein:

$Ar^1$, $Ar^2$, L, n, $Q^1$ and $Q^2$ are as defined previously, and $L^1$ and $L^2$ are selected from the group consisting of Br, I and Cl, thereby enabling reaction with other appropriately substituted monomers. The nitrogen atom indicated in the above structure may also be substituted with a fourth moiety, $Q^3$ (see structure (I) and accompanying substituent definitions) if a polymer substituted with a quaternary ammonium salt is desired rather than a polymer substituted with an uncharged amino group.

In preferred polymers, such monomers have the structure of formula (XXII)

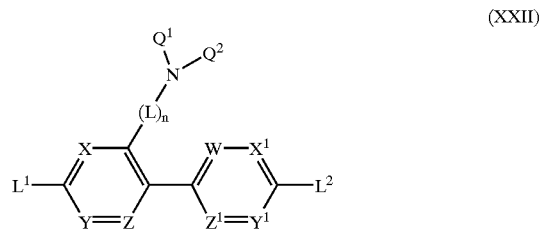

(XXII)

wherein X, Y, Z, W, $X^1$, $Y^1$, $Z^1$, L, n, $Q^1$ and $Q^2$ are as defined earlier.

By way of example, the polymers of the invention may be synthesized via the Yamamoto reductive coupling polymerization reaction from dihalo monomers. One specific example of such a reaction is as follows:

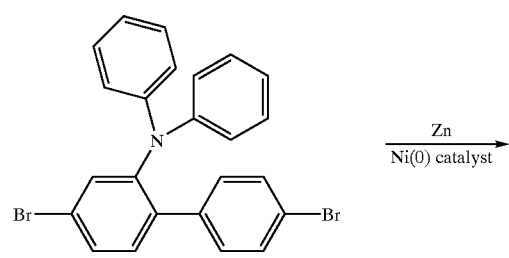

-continued

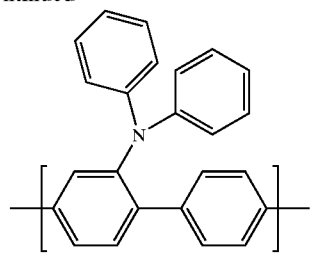

The Ni(0) catalyst can be generated from Zn and NiCl$_2$ in the presence of triphenylphosphine and, optionally, 2,2'-dipyridyl; see Example 4. Some commercially available Ni(0) catalysts may also be used, such as bis (triphenylphosphine) nickel chloride. Coupling reactions involving dihalo-functional reactants and nickel catalysts have been described, for example, by Colon et al. (1990) *Journal of polymer Science, Part A, Polymer Chemistry Edition* 28:367 and Colon et al. (1986) *Journal of Organic Chemistry* 51:2627. The reaction is typically conducted in a polar aprotic solvent (e.g., dimethylacetamide) with a catalytic amount of nickel salt (e.g., NiCl$_2$, as indicated above), a substantial amount of triphenylphosphine and a large excess of zinc dust. A variant of this process is described by Ioyda et al. (1990) *Bulletin of the Chemical Society of Japan* 63:80, wherein an organo-soluble iodide was used as an accelerator. Another nickel-coupling reaction is disclosed by Yamamoto (1992) *Progress in Polymer Science* 17:1153 wherein a mixture of dihaloaromatic compounds were treated with an excess amount of nickel (1,5-cyclooctadiene) complex in an inert solvent. All nickel-coupling reactions when applied to reactant mixtures of two or more aromatic dihalides yield essentially random copolymers. Such polymerization reactions may be terminated by the addition of small amounts of water to the polymerization reaction mixture, which will replace the terminal halo substituents atoms with hydrogens. Alternatively, a monofunctional aryl halide may be used as a chain terminator in such reactions, which will result in the formation of a terminal aryl group. By introducing appropriate end groups, stability and processability can be enhanced. Crosslinkable functional groups such as carboxylic acid groups and amino moieties may also be introduced into the polymer as end groups. Furthermore, by using an appropriately substituted starting material, e.g., a starting material substituted with a polar group such as a lower alkoxy, nitro or sulfonic acid substituent, the aqueous solubility of the polymeric product can be enhanced.

Copolymers of the invention may also be prepared using the Yamamoto reaction, wherein a dihalo-substituted (e.g., dibromo-substituted) first monomer is reacted with a dihalo-substituted second monomer. The first monomer may be any one of (VI), (VII), (VIII) and (IX) (preferably any one of (X), (XI), (XII) and (XIII)), and the second monomer will be a dihalo-substituted monomer corresponding to the second monomer units described in the preceding section.

Other processes may also be used to synthesize the polymers of the invention. One notable example is the Suzuki coupling polymerization process, as follows:

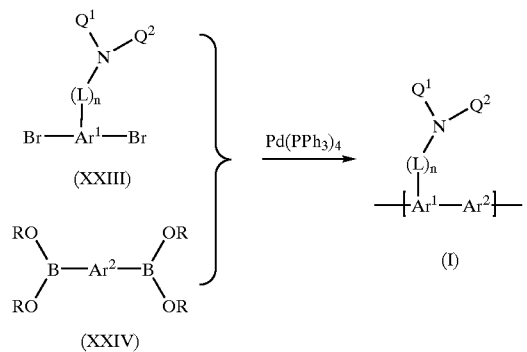

In the above scheme, $Ar^1$, $Ar^2$, L, n, $Q^1$ and $Q^2$ are as defined previously, and R is H or alkyl, or two R groups bound to the same boron atom may form a ring such as ethylenedioxy or 1,1,2,2-tetramethylenedioxy. Such a condensation reaction of an aromatic boronate and a bromide, commonly referred to as the "Suzuki reaction", is tolerant of the presence of a variety of organic functional groups, as reported by Miyaua and Suzuki in *Chemical Reviews* 95: 2457–2483 (1995). This reaction can be applied to preparing high molecular weight polymers and copolymers. Procedurally, the substituted aromatic dibromide shown is reacted with an approximately equimolar amount of the diboronate under the catalytic action of Pd and triphenylphosphine. The reaction is typically conducted at about 70° C. to 120° C. in an aromatic hydrocarbon solvent such as toluene. Other solvents such as dimethylformamide and tetrahydrofuran can also be used, either alone or in mixtures with an aromatic hydrocarbon. An aqueous base, preferably sodium carbonate or bicarbonate, is used as the HBr scavenger. Depending on the reactivities of the reactants, the polymerization reaction may take 2 to 100 hours. Other variations of reaction conditions are given by Wallow and Novak (1994) *Journal of Organic Chemistry* 59:5034–5037 (1994), and by Remmers et al. (1996) *Macromolecular Rapid Communications* 17:239–252. An alternating copolymer results using the Suzuki reaction, although it is possible to control the sequencing of the monomeric units in the copolymer by controlling the order and composition of monomer feeds. If desired, a monofunctional aryl halide or aryl boronate may be used as a chain terminator in such reactions, which will result in the formation of terminal aryl groups.

It will be appreciated that the aforementioned reaction can also be used to prepare copolymers of the invention by starting with the monomer (XXV)

and polymerizing with the comonomer (XXVI)

wherein R is as defined previously and $Ar^6$ represents the second monomer unit as defined in the preceding section.

As will be appreciated by those working in the field of conjugated polymers, the conjugated electroluminescent polymers of the invention may be prepared by a host of other techniques not specifically described above. See, for example, *Handbook of Conducting Polymers, $2^{nd}$ Ed.*, Skotheim et al., Eds. (New York: Marcel Dekker, Inc., 1998), particularly Chapter 13, and references cited therein.

Utility

In general, the polymers of the invention are useful in any application wherein a conjugated polymer, particularly a conjugated electroluminescent polymer, would have utility. For example, the present polymers are suitable as the active material in the following devices: thin film semiconductor devices such as light emitting diodes and displays, laser diodes, transistors, photodetectors, photoconductors, and solar cells; electrochemical devices such as rechargeable batteries, capacitors, supercapacitors, electrochromic devices, electrode-modifying materials, light emitting electrochemical cells (both in thin film and in solution), and sensors; and in optoelectronic devices such as photorefractive devices, optical switches, and optical data storage devices. Furthermore, upon being rendered conductive by doping or admixture with an ionizable species (e.g., using ion implantation), the polymers of the invention will find additional utility in those contexts wherein a conductive polymer would be useful.

Semiconductive compositions may be prepared that comprise a polymer of the invention optionally combined with an admixer, typically a compound selected such that charge and/or energy transfer takes place between the admixer and the polymer when a voltage is applied across the composition. For example, the admixer may be a second conjugated polymer, either a poly(paraphenylene) polymer, copolymer or analog as provided herein, or another type of conjugated polymer, typically selected from cis and trans polyacetylenes, polydiacetylenes, polypyrroles, polythiophenes, polybithiophenes, polyisothianaphthene, polythienylvinylenes, polyphenylenesulfide, polyaniline, polyphenylenevinylenes, and polyphenylenevinylene derivatives, for example, MEH-PPV, BCHA-PPV, poly(2-N,N-dimethylamino phenylene vinylene) and polythienylvinylenes. The admixer may also be a fullerene such as: $C_{60}$ itself ("Buckminsterfullerene"), having icosahedral symmetry and consisting of 12 five-membered rings and 20 six-membered rings; a higher order fullerene such as the ellipsoidally shaped $C_{70}$ and $C_{84}$, the icosahedrally shaped $C_{80}$ or $C_{140}$, or the giant, spherically shaped $C_{256}$; a hyperfullerene (or fullerene "onion") comprised of a concentric carbon cage that preferably contains $C_{60}$ (e.g., $C_{60}@C_{180}$, $C_{60}@C_{240}$, $C_{60}@C_{540}$, $C_{60}@C_{240}@C_{540}$); fullerene nanotubes; and fullerene capsules. Such semiconductive compositions may also advantageously contain one or more additional components, such as color modifiers, stability enhancers, crosslinking agents, ionizable species, phosphorescent dyes (as described, for example, by Baldo et al. (1998), "Highly Efficient Phosphorescent Emission from Organic Electroluminescent Devices," *Nature* 395:151–154), and the like.

Conductive compositions may be prepared by doping the polymers of the invention for conversion thereof to a conductive state. The term "doping" is used herein in its conventional sense to refer to the addition or withdrawal of electrons to a conjugated polymer so that positive or negative charge is introduced therein. Doping is thus essentially a redox reaction that involves electron transfer between a conjugated polymer and a dopant. Doping may be carried out electrochemically, by chemical treatment with a dopant (e.g., an oxidant dopant such as $AsF_5$, $FeCl_3$, iodine, $H_2SO_4$, $SO_3$, $HClO_4$, $CF_3COOH$, $H_2O_2$, etc.) or by other means, as will appreciated by those skilled in the art. See, e.g., T. A. Skotheim et al., "*Electroresponsive Molecular and Polymeric Systems*," (New York: Marcel Dekker, 1991). Doping will generally be reversible, such that the conductive polymer can return to its original semiconductive state, or in some cases it may be permanent.

The polymers of the invention are particularly useful as electroluminescent materials (i.e., as materials that can generate light upon electrical excitation) in electroluminescence devices such as LEDs, photodetector devices, light-emitting electrochemical cells, and the like. Electroluminescence devices, including LEDs, are generally comprised of laminates of a suitable electroluminescent material disposed between a hole-injecting electrode layer and an electron-injecting electrode layer. Additional layers, elements, and/or a substrate may or may not be present. In a photodetector device, for example, a means for detecting a photocurrent (i.e., a light-induced electrical current) flowing between the electrodes will be included. Another use of the present polymers is in a photovoltaic device used for the generation of electrical power. Such devices generally comprise a first electrode, a semiconductive layer provided on the first electrode, and a second electrode (sometimes termed a "collector electrode") provided on the light incidence surface of the semiconductive layer; a polymer of the invention may be advantageously used as the aforementioned semiconductive layer. Electrochemical sensors may also be fabricated using the present polymers; such sensors are generally comprised of a counter electrode, a reference electrode, a working electrode, an optional reference electrode, and a means for applying an electrical potential between the working and counter electrodes, wherein a polymer of the invention is applied to the surface of the working electrode. The polymers are also useful in the fabrication of transistors, particularly field effect transistors. FETs, as is well known in the art, are comprised of a gate electrode, a source electrode, a drain electrode, and a semiconductive channel, e.g., comprising a polymer of the invention, electrically connecting the source electrode and the drain electrode.

A particularly preferred application of the present polymers is in the fabrication of an cavity-emission electroluminescent device as described in commonly assigned, co-pending U.S. patent application Ser. No. 09/618,864, entitled "Cavity-Emission Electroluminescent Device and Method for Forming the Device" (Pei et al.), filed on even date herewith. The cavity-emission electroluminescent device is comprised of a layered structure having a hole-injection electrode layer for injecting holes into an electroluminescent material, an electron-injection electrode layer for injecting electrons into an electroluminescent material and a dielectric layer interposed between the hole-injecting and electron-injecting electrode layers. A cavity is formed extending through at least the dielectric layer and one of the electrode layers and has an interior cavity surface comprising a hole-injection electrode region, an electron-injection electrode region and a dielectric region. Once the cavity is formed, the interior cavity surface is coated with an electroluminescent coating material of the invention such that the electroluminescent material electrically contacts the hole-injection and electron-injection electrode regions of the surface. Optionally, a plurality of cavities in an array may be formed in a layered structure to form an electroluminecent display device.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXPERIMENTAL

The practice of the present invention will employ, unless otherwise indicated, conventional techniques of polymer chemistry, and the like, which are within the skill of the art. Such techniques are explained fully in the pertinent texts and literature. See, e.g., *Vogel's Textbook of Practical Organic Chemistry*, 5$^{th}$ Ed., B. S. Furniss et al., eds. (New York: Longman Scientific and Technical, 1989); A. Kraft et al. (1998) *Angew. Chem. Int. Ed.* 37:402–428; and T. A. Skotheim et al., "*Electroresponsive Molecular and Polymeric Systems*," (New York: Marcel Dekker, 1991), cited supra.

In the following examples, efforts have been made to ensure accuracy with respect to numbers used (e.g., amounts, temperature, etc.) but some experimental error and deviation should be accounted for. Unless indicated otherwise, temperature is in degrees C and pressure is at or near atmospheric. All solvents were purchased as HPLC grade, and all reactions were routinely conducted under an inert atmosphere of nitrogen unless otherwise indicated. All reagents were obtained commercially unless otherwise indicated.

EXAMPLE 1

Synthesis of 4,4'-Dibromo-2-Diphenylamino-1,1'-biphenyl 4,4'-Dibromo-2-amino-1,1'-biphenyl (16.35 g, prepared according to Libman and Slack (1951) *J. Chem. Soc.*, p. 2588), iodobenzene (26.52 g, 0.13 mol), flake potassium hydroxide (22.4 g, 0.35 mol), 1,10-phenanthroline (0.45 g), copper (I) chloride (0.25 g), and toluene (30 ml) were charged into a flask and stirred at reflux for 15 hours. The dark reaction mixture was cooled to room temperature and diluted with 200 ml of toluene. The toluene solution was washed with DI water, dried with magnesium sulfate, and evaporated. The dark residue obtained was recrystallized trice from hexane/toluene (4:1 in volume) to yield 10 grams of white crystals to yield the desired monomer. $^1$H NMR (CDCl$_3$): δ=6.8–7.5, multiple peaks.

EXAMPLE 2

Synthesis of 4,4'-Dibromo-2-Bis(4-methoxyphenly)amino-1,1'-biphenyl 4,4'-Dibromo-2-amino-1,1'-biphenyl (16.35 g, 0.05 mol), 4-iodoanisole (28 g, 0.12 mol), potassium carbonate (–325 mesh fine powder, 16.6 g, 0.12 mole), copper dust (–150 mesh, 1.0 g), and nitrobenzene (20 ml) were charged into a flask and stirred at gentle reflux for 15 hours. The dark reaction mixture was cooled to room temperature and extracted with 200 ml of toluene. The toluene solution was evaporated. The dark residue obtained was then mixed with 10 ml of toluene and chromatographed on a silica gel column using hexane and hexane/ethyl acetate (20:1) eluent. The portions containing the product were collected and evaporated. The residue was recrystallized twice from hexane/toluene (300 ml/60 ml) to yield 7.4 grams of off-white crystals of the desired monomer. $^1$H NMR (CDCl$_3$): δ=6.8–7.5 (15H, multiple peaks); 3.78 (6H).

EXAMPLE 3

Synthesis of 4,4'-Dibromo-2-Dioctylamino-1,1'-biphenyl

The reaction of Example 1 was repeated, except that 1-bromooctane (25.09 g, 0.13 mole) was used in place of iodobenzene. The product was purified by column chromatography on silica gel using hexanes as eluent.

EXAMPLE 4

Preparation of Poly(2-Diphenylamino-1,1'-Biphenyl-4,4'-Diyl)

4,4'-Dibromo-2-diphenylamino-1,1'-biphenyl (2.87 g, prepared in Example 1), triphenylphosphine (1.57 g), zinc powders (1.17 g), 2,2'-dipyridyl (0.047 g), and Ni(II) chloride (0.039 g) were placed in a 100 ml round-bottom flask, and purged with pure nitrogen. Then, 1-methyl-2-pyrrolidinone (30 ml) was added via syringe, and the mixture was stirred under nitrogen at 75° C. for 60 hours. The temperature was raised to 85° C., and one drop of 1-bromo-4-t-butylbenezen was added. The mixture was further stirred at 85° C. for 5 hours and then cooled to room temperature. Methanol (50 ml) was added. The precipitate was collected by centrifugation and washed repeatedly with methanol. It was redissolved in 50 ml chloroform. The chloroform solution was centrifuged to remove insoluble particles. Into the clear solution, 100 ml methanol was added. The polymer precipitate was collected by centrifugation. The polymer was dried in vacuum to yield 1.5 gram of off-white solid.

EXAMPLE 5

Preparation of Poly[(2-Diphenylamino-1,1'-Biphenyl-4,4'-Diyl)-co-(2-Dioctylamino-1,1'-Biphenyl-4,4'-Diyl)]

The procedure of Example 4 was followed, except that 0.33 g of 4,4'-dibromo-2-dioctylamino-1,1'-biphenyl was used in addition to 4,4'-dibromo-2-diphenylamino-1,1'-biphenyl.

EXAMPLE 6

Preparation of Poly[(2-Diphenylamino-1,4-Phenylene)

1,4-Dibromo-2-diphenylaminobenzene (2.01 g) (prepared from 2,5-dibromoaniline and iodobenzene using the method of Example 2), triphenylphosphine (1.6 g), zinc powders (1.2 g), 2,2'-dipyridyl (0.05 g), and Ni(II) chloride (0.04 g) were placed in a 100 ml round-bottom flask, and purged with pure nitrogen. Then N,N-dimethylformamide (25 ml) was added via syringe, and the mixture was stirred under nitrogen protection at 80° C. for 48 hours. Methanol (40 ml) was added. The precipitate was collected by centrifugation, washed repeatedly with methanol, and then redissolved in 50 ml tetrahydrofuran. The THF solution was centrifuged to remove insoluble particles (mostly unreacted zinc). Into the clear solution, 5 ml of 10% HCl solution was added. DI water (50 ml) was then added, and the polymer precipitate was collected by centrifugation. The polymer was further purified in THF/methanol, and dried in vacuum to yield 0.65 gram of white solid.

EXAMPLE 7

Synthesis of Poly(2-bis [4-methoxyphenyl]amino-1,1'-biphenyl-4,4'-Diyl)

4,4'-Dibromo-2-bis(4-methoxyphenyl)amino-1,1'-biphenyl (5.4 g, prepared in Example 2), triphenylphosphine (1.3 g), zinc powders (1.96 g), 2,2'-dipyridyl (0.078 g), and Ni(II) chloride (0.065 g) were placed in a 100 ml round-bottom flask, and purged with pure nitrogen. Then, 1-methyl-2-pyrrolidinone (30 ml) was added via syringe, and the mixture was stirred under nitrogen protection at 75° C. for 15 hours when the solution became very viscous. More 1-methyl-2pyrrolidinone (20 ml) was added. The temperature was raised to 85° C. After 20 hours, 1 drop of 1-bromo-4-t-butylbenzene was added. The mixture was further stirred at 85° C. for 5 hours and cooled to room temperature. The polymer was purified by repeated precipitation and dissolution in methanol and chloroform to yield 2.4 g of a bright yellow solid. $^1$H NMR (CDCl$_3$): δ=6.55–7.5 (multiple peaks), 3.7 (single peak), 1.6 (single peak). The relative ratio of H content indicates an average polymer chain containing 18 2-bis[4-methoxyphenyl]amino-1,1'-biphenyl-4,4'-diyl monomer units end-capped with 4-tert-butylphenyl groups. This corresponds to a number average molecular weight of approximately 7100.

EXAMPLE 8

Processability and Fluorescence

The polymers prepared in Examples 4, 5, 6 and 7 were admixed with various organic solvents, including water, chlorinated solvents such as chloroform and chlorobenzene, and other organic solvents such as methanol and n-butyl acetate. Each of the polymers were found to have good solubility in the chlorinated solvents, but were relatively insoluble in methanol, n-butyl acetate and water. High quality thin films were formed after the polymer solutions were cast on glass slides and solvents evaporated. The films of poly(2-diphenylamino-1,1'-biphenyl-4,4'-diyl) appeared colorless, and fluoresced brilliant blue light with a photoluminescent quantum efficiency of greater than 50%. Films of poly(2-bis[4-methoxyphenyl]amino-1,1'-biphenyl-4,4'-diyl) appeared light yellow and fluoresced brilliant green light, also with a photoluminescent quantum efficiency greater than 50%.

EXAMPLE 9

Stability Evaluation

Thin films of poly(2-diphenylamino-1,1'-biphenyl-4,4'-diyl) and poly(2-bis[4-methoxphenyl]amino-1,1'-biphenyl-4,4'-diyl) as prepared in the Examples 4 and 7, respectively, were found to be very stable in air even at elevated temperatures. After being heated on a hot plate at 130° C. for 5 hours, there was no observable change in absorption color or fluorescent color, nor was any degradation in photoluminescent quantum efficiency was observed. Additional stability testing was conducted with poly(2-diphenylamino-1,1'-biphenyl-4,4'-diyl), and after heating at 170° C. for 5 hours, there was no observable change in optical absorption or fluorescent color, nor was any degradation in photoluminescent quantum efficiency observed.

I claim:

1. A conjugated electroluminescent polymer comprised of monomer units having the structure of formula (I)

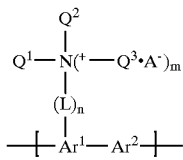

(I)

wherein
- Ar$^1$ and Ar$^2$ are independently selected from the group consisting of monocyclic, bicyclic and polycyclic arylene, heteroarylene, substituted arylene and substituted heteroarylene groups;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene;
- m is zero or 1;
- n is zero or 1;
- Q$^1$ is selected from the group consisting of aryl, heteroaryl, substituted aryl, substituted heteroaryl, alkyl, and substituted alkyl;
- Q$^2$ is selected from the group consisting of H, aryl, heteroaryl, substituted aryl, substituted heteroaryl, alkyl, and substituted alkyl; and
- Q$^3$ is selected from the group consisting of alkyl, substituted alkyl, heteroalkyl, and substituted heteroalkyl, with the proviso that when m is 1, Q$^2$ is other than H; and
- A$^-$ is a negatively charged counterion,
- and further wherein when n is zero, at least one of the following is satisfied;
  - (a) m is 1; and
  - (b) at least one of Ar$^1$, Ar$^2$, Q$^1$, and Q$^2$ is substituted with a substituent selected from —SO$_3$H, —COOH, or —P(O)OH$_2$ groups; C$_1$-C$_{20}$ hydrocarbyl or heteroatom-containing C$_1$-C$_{20}$ hydrocarbyl substituted with one or more —SO$_3$H, —COOH, or —P(O)OH$_2$ groups; or with organic or inorganic sulfonate, carboxylate or phosphonate salts; or a combination thereof.

2. The polymer of claim 1, having the structure of formula (II)

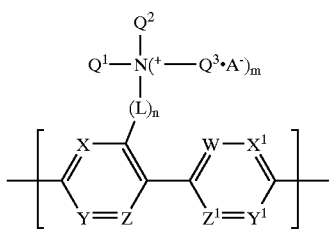

(II)

wherein:
- W, X, Y, Z, X$^1$, Y$^1$, and Z$^1$ are independently selected from the group consisting of N, CH, and CR$^1$, wherein R$^1$ is selected from the group consisting of —(L)$_n$—N(Q$^1$Q$^2$), —(L)$_n$—N(Q$^1$Q$^2$Q$^3$)$^+$A$^-$, C$_1$-C$_{20}$ hydrocarbyl, substituted C$_1$-C$_{20}$ hydrocarbyl, heteroatom-containing C$_1$-C$_{20}$ hydrocarbyl, substituted heteroatom-containing C$_1$-C$_{20}$ hydrocarbyl, halo, cyano, nitro, —SO₃H, —COOH, —O(PO)(OH)₂, and organic and inorganic sulfonate, carboxylate and phosphonate salts, and further wherein Z and $Z^1$ may be linked to form a cyclic group.

3. The polymer of claim 2, wherein:

m is zero;

L is an arylene, heteroarylene, substituted arylene or substituted heteroarylene linkage $Ar^3$ containing one to three aromatic rings; and $Q^1$ and $Q^2$ are independently selected from the group consisting of aryl, heteroaryl, substituted aryl and substituted heteroaryl groups $Ar^4$ and $Ar^5$, respectively, each containing one or two aromatic rings, such that the monomer units have the structure of formula (III)

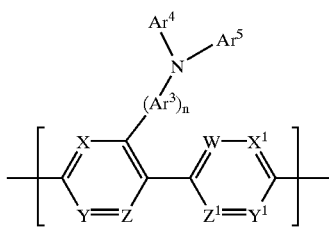

(III)

in which:

W, X, Y, Z, $X^1$, $Y^1$, and $Z^1$ are independently selected from the group consisting of N, CH, and $CR^1$, wherein $R^1$ is selected from the group consisting of —$(Ar^3)_n$—$NAr^4Ar^5$, $C_1$–$C_{12}$ alkyl, fluorinated $C_1$–$C_{12}$ alkyl, $C_1$–$C_{12}$ alkoxy, fluoro, cyano, nitro, —SO₃H, —COOH, —O(PO)(OH)₂, and organic and inorganic sulfonate, carboxylate and phosphonate salts, and further wherein Z and $Z^1$ may be linked to form cyclic group so as to form a three-ring compound having the structure (IV)

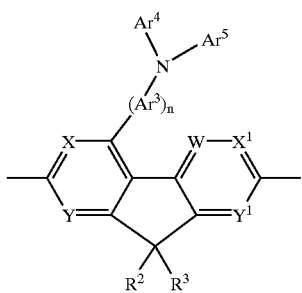

(IV)

in which $R^2$ and $R^3$ are independently selected from the group consisting of hydrogen, alkyl, substituted alkyl, heteroatom-containing alkyl, and substituted heteroatom-containing alkyl.

4. The polymer of claim 3, wherein W, X, Y, $X^1$ and $Y^1$ are each CH.

5. The polymer of claim 4, wherein Z and $Z^1$ are CH or $CR^1$.

6. The polymer of claim 5, wherein Z and $Z^1$ are $CR^1$.

7. The polymer of claim 5, wherein Z is CH and $Z^1$ is —$CR^1$.

8. The polymer of claim 3, wherein Z and $Z^1$ are linked to form a cyclic group so as to form a fused three-ring compound having the structure (IV).

9. The polymer of claim 8, wherein $R^2$ and $R^3$ are the same.

10. The polymer of claim 9, wherein $R^2$ and $R^3$ are selected from the group consisting of: hydrogen; linear or branched alkyl substituents containing 4 to 12 carbon atoms; cyano-substituted alkyl substituents containing 1 or 2 cyano groups on a 4 to 10 carbon atom linear or branched alkyl group; and polyether substituents containing 2 to 5 ether oxygen atoms separated from one another by 1, 2 or 3 carbon alkylene bridges.

11. The polymer of claim 3, wherein at least one of W, X, Y, Z, $X^1$, $Y^1$ and $Z^1$ is N.

12. The polymer of claim 3, wherein at least one of X, Y, Z, $X^1$, $Y^1$ and $Z^1$ is $CR^1$ and $R^1$ is heteroatom-containing alkyl.

13. The polymer of claim 12, wherein $R^1$ is alkoxy.

14. The polymer of claim 12, wherein $R^1$ is a polyether substituent.

15. The polymer of claim 3, wherein $Ar^4$ and $Ar^5$ are independently selected from the group consisting of unsubstituted phenyl and phenyl substituted with at least one substituent selected from the group consisting of $C_1$–$C_{12}$ alkyl, fluorinated $C_1$–$C_{12}$ alkyl, $C_1$–$C_{12}$ alkoxy, fluoro, cyano, nitro, sulfonate, carboxylate and phosphonate groups.

16. The polymer of claim 15, wherein $Ar^4$ and $Ar^5$ are both unsubstituted phenyl.

17. The polymer of claim 15, wherein at least one of $Ar^4$ and $Ar^5$ is phenyl substituted with at least one substituent selected from the group consisting of lower alkyl, fluorinated lower alkyl, lower alkoxy, fluoro, cyano, nitro, and alkali metal sulfonate groups.

18. The polymer of claim 1, in the form of a homopolymer.

19. A semiconductive composition comprising a polymer or copolymer according to claim 1 or 3.

20. A semiconductive composition, comprising at least one admixer and a polymer comprised of monomer units having the structure of formula (1)

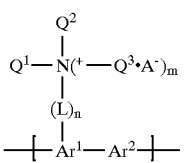

(I)

wherein:

$Ar^1$ and $Ar^2$ are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene, m is zero or 1;

n is zero or 1;

$Q^1$ is selected from the group consisting of aryl, heteroaryl, substituted aryl, substituted heteroaryl, alkyl, and substituted alkyl;

$Q^2$ is selected from the group consisting of H, aryl, heteroaryl, substituted aryl, substituted heteroaryl, alkyl, and substituted alkyl; and $Q^3$ is selected from the group consisting of alkyl, substituted alkyl, heteroalkyl, and substituted heteroalkyl, with the proviso that when m is 1, $Q^2$ is other than H; and $A^-$ is a negatively charged conterion.

21. The composition of claim 20, wherein the admixer is selected such that charge and/or energy transfer takes place between the admixer and the polymer when a voltage is applied across the composition.

22. The composition of claim 21, wherein the admixer is a second polymer.

23. The composition of claim 21, wherein the admixer is a fullerene selected from the group consisting of $C_{60}$, higher order fullerenes, and mixtures thereof.

24. The composition of claim 23, wherein the fullerene is a nanotube.

25. The composition of claim 19, further including at least one of a color modifier, stability enhancer, cross-linking agent, and ionizable species.

26. In a conductive composition comprised of a doped conjugated polymer, the improvement comprising employing a polymer or copolymer comprised of monomer units having the structure of formula (I)

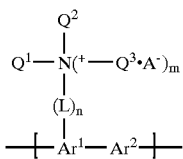
(I)

wherein:
- $Ar^1$ and $Ar^2$ are independently selected from the group consisting of monocyclic, bicyclic and polycyclic arylene, heteroarylene, substituted arylene and substituted heteroarylene groups;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene;
- m is zero or 1;
- n is zero or 1;
- $Q^1$ is selected from the group consisting of aryl, heteroaryl, substituted aryl, substituted heteroaryl, alkyl, and substituted alkyl;
- $Q^2$ is selected from the group consisting of H, aryl, heteroaryl, substituted aryl, substituted heteroaryl, alkyl, and substituted alkyl;
- $Q^3$ is selected from the group consisting of alkyl, substituted alkyl, heteroalkyl, and substituted heteroalkyl, with the proviso that when m is 1, $Q^2$ is other than H; and
- $A^-$ is a negatively charged counterion.

27. In an electroluminescence device having an organic light-emitting layer disposed between a hole-injecting electrode and an electron-injecting electrode, the improvement which comprises employing an organic light-emitting layer comprised of a polymer or copolymer according to claim 1 or 3.

28. In a field effect transistor comprising a gate electrode, a source electrode, a drain electrode, and a channel electrically connecting the source electrode and the drain electrode, the improvement which comprises employing a channel comprised of a polymer or copolymer comprised of monomer units having the structure of formula (I)

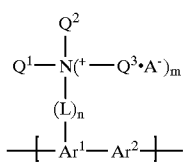
(I)

wherein:
- $Ar^1$ and $Ar^2$ are independently selected from the group consisting of monocyclic, bicyclic and polycyclic arylene, heteroarylene, substituted arylene and substituted heteroarylene groups;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene,
- m is zero or 1;
- n is zero or 1;
- $Q^1$ is selected from the group consisting of aryl, heteroaryl, substituted aryl, substituted heteroaryl, alkyl, and substituted alkyl;
- $Q^2$ is selected from the group consisting of H, aryl, heteroaryl, substituted aryl, substituted heteroaryl, alkyl, and substituted alkyl;
- $Q^3$ is selected from the group consisting of alkyl, substituted alkyl, heteroalkyl, and substituted heteroalkyl, with the proviso that when m is 1, $Q^2$ is other than H; and
- $A^-$ is a negatively charged conterion.

29. In a photodetector device comprised of a semiconductive layer disposed between first and second electrodes, and a means for detecting a photocurrent flowing between the electrodes, the improvement which comprises employing a semiconductive layer comprised of a polymer or copolymer comprised of monomer units having the structure of formula (I)

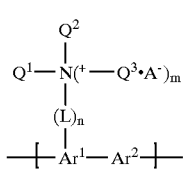
(I)

wherein:
- $Ar^1$ and $Ar^2$ are independently selected from the group consisting of monocyclic, bicyclic and polycyclic arylene, heteroarylene, substituted arylene and substituted heteroarylene groups;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene,
- m is zero or 1;
- n is zero or 1;
- $Q^1$ is selected from the group consisting of aryl, heteroaryl, substituted aryl, substituted heteroaryl, alkyl, and substituted alkyl;
- $Q^2$ is selected from the group consisting of H, aryl, heteroaryl, substituted aryl, substituted heteroaryl, alkyl, and substituted alkyl;

Q³ is selected from the group consisting of alkyl, substituted alkyl, heteroalkyl, and substituted heteroalkyl, with the proviso that when m is 1, Q² is other than H; and A⁻ is a negatively charged conterion.

30. In a photovoltaic device useful for the generation of electrical power comprised of a first electrode, a semiconductive layer provided on the first electrode, and a second electrode provided on the light incidence surface of the semiconductive layer, the improvement which comprises employing a semiconductive layer comprised of a polymer or copolymer comprised of monomer units having the structure of formular (I)

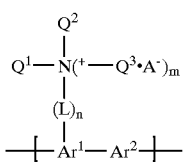
(I)

wherein:
Ar¹ and Ar² are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene, m is zero or 1;

n is zero or 1;

Q¹ is selected from the group consisting of aryl, heteroaryl, substituted aryl, substituted heteroaryl, alkyl, and substituted alkyl;

Q² is selected from the group consisting of H, aryl, heteroaryl, substituted aryl, substituted heteroaryl, alkyl, and substituted alkyl;

Q³ is selected from the group consisting of alkyl, substituted alkyl, heteroalkyl, and substituted heteroalkyl, with the proviso that when m is 1, Q² is other than H; and A⁻ is a negatively charged conterion.

31. In a light-emitting electrochemical cell comprised of a conductive transparent or semitransparent substrate, a thin film of a conjugated polymer and an ionizable species deposited on the substrate, and an electrode deposited on the thin film, the improvement which comprises employing in the thin film a polymer or copolymer comprised of monomer units having the structure of formula (I)

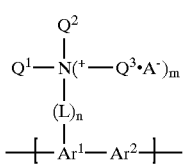
(I)

wherein:
Ar¹ and Ar² are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene, m is zero or 1;

n is zero or 1;

Q¹ is selected from the group consisting of aryl, heteroaryl, substituted aryl, substituted heteroaryl, alkyl, and substituted alkyl;

Q² is selected from the group consisting of H, aryl, heteroaryl, substituted aryl, substituted heteroaryl, alkyl, and substituted alkyl;

Q³ is selected from the group consisting of alkyl, substituted alkyl, heteroalkyl, and substituted heteroalkyl, with the proviso that when m is 1, Q² is other than H; and A⁻ is a negatively charged conterion.

32. In an electrochemical sensor comprising a counter electrode, a working electrode, and a means for applying or measuring an electrical potential between the working and counter electrodes, the improvement which comprises employing on the surface of the working electrode a polymer or copolymer comprised of monomer units having the structure of formula (I)

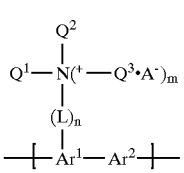
(I)

wherein:
Ar¹ and Ar² are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene, m is zero or 1;

n is zero or 1;

Q¹ is selected from the group consisting of aryl, heteroaryl, substituted aryl, substituted heteroaryl, alkyl, and substituted alkyl;

Q² is selected from the group consisting of H, aryl, heteroaryl, substituted aryl, substituted heteroaryl, alkyl, and substituted alkyl;

Q³ is selected from the group consisting of alkyl, substituted alkyl, heteroalkyl, and substituted heteroalkyl, with the proviso that when m is 1, Q² is other than H; and A⁻ is a negatively charged conterion.

33. A cavity-emission electroluminescent device, comprising a layered structure of
a hole-injection electrode layer,
an electron-injection electrode layer, and
a dielectric layer interposed between the hole-injecting and electron-injecting electrode layers and
a cavity extending through at least the dielectric layer and one of the electrode layers and having an interior cavity surface comprising a hole-injection electrode region, an electron-injection electrode region and a dielectric region, wherein an electroluminescent coating material comprising a polymer or copolymer is in electrical contact with the hole-injection and electron-injection electrode regions of the interior cavity surface, and wherein said polymer or copolymer is comprised of monomer units having the structure of formula (I)

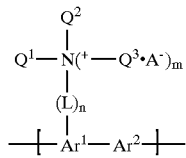

(I)

wherein:

Ar$^1$ and Ar$^2$ are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, or substituted heteroarylene, m is zero or 1;

n is zero or 1;

Q$^1$ is selected from the group consisting of aryl, heteroaryl, substituted aryl, substituted heteroaryl, alkyl, and substituted alkyl;

Q$^2$ is selected from the group consisting of H, aryl, heteroaryl, substituted aryl, substituted heteroaryl, alkyl, and substituted alkyl;

Q$^3$ is selected from the group consisting of alkyl, substituted alkyl, heteroalkyl, and substituted heteroalkyl, with the proviso that when m is 1, Q$^2$ is other than H; and A$^-$ is a negatively charged conterion.

34. A conjugated polymer comprised of a poly(arylene) backbone containing repeating monomer units -[Ar$^1$–Ar$^2$]- and having a sidechain selected from —NQ$^1$Q$^2$ and —(N$^+$Q$^1$Q$^2$Q$^3$)A directly or indirectly bound to Ar$^1$, wherein:

Ar$^1$ and Ar$^2$ are independently selected from the group consisting of monocyclic, bicyclic and polycyclic arylene, heteroarylene, substituted arylene and substituted heteroarylene groups;

Q$^1$ is selected from the group consisting of aryl, heteroaryl, substituted aryl, substituted heteroaryl, alkyl, and substituted alkyl;

Q$^2$ is selected from the group consisting of H, aryl, heteroaryl, substituted aryl, substituted heteroaryl, alkyl, and substituted alkyl; and Q$^3$ is selected from the group consisting of alkyl and substituted alkyl, with the proviso that when the sidechain is —(N$^+$Q$^1$Q$^2$Q$^3$)A, then Q$^2$ is other than H; and A$^-$ is a negatively charged counterion, and further wherein when said sidechain is directly bound to Ar$^1$, then at least one of the following is satified:

(a) the sidechain is —(N$^+$Q$^1$Q$^2$Q$^3$)A$^-$; and (b) at least one of Ar$^1$, Ar$^2$, Q$^1$, and Q$^2$ is substituted with a substituent selected from —SO$_2$H, —COOH, or —P(O)OH$_2$ groups; C$_1$–C$_{20}$ hydrocarbyl or heteroatom-containing C$_1$–C$_{20}$ hydrocarbyl substituted with one or more —SO$_3$H, —COOH, or —P(O)OH$_2$ groups; or with organic or inorganic sulfonate, carboxylate or phosphonate salts; or a combination thereof.

35. The polymer of claim 34, wherein Ar$^1$ and Ar$^2$ are selected from the group consisting of monocyclic five-membered and six-membered arylene, heteroarylene, substituted arylene and substituted heteroarylene groups, and linked or fused bicyclic or tricyclic such groups.

36. The polymer of claim 35, wherein Ar$^1$ and Ar$^2$ are selected from the group consisting of phenylene and substituted phenylene.

37. The polymer of claim 35, wherein Ar$^1$ and Ar$^2$ are phenylene.

38. The polymer of claim 34, wherein the sidechain has the structure —NQ$^1$Q$^2$.

39. The polymer of claim 38, wherein Q$^1$ and Q$^2$ are selected from the group consisting of monocyclic five-membered and six-membered aryl, heteroaryl, substituted aryl and substituted heteroaryl groups, and linked or fused bicyclic or tricyclic such groups.

40. The polymer of claim 39, wherein Q$^1$ and Q$^2$ are selected from the group consisting of phenyl and substituted phenyl.

41. The polymer of claim 40, wherein Q$^1$ and Q$^2$ are phenyl.

42. A conjugated polymer comprised of a poly (paraphenylene) backbone containing repeating monomer units -[Ar$^1$–Ar$^2$]- and having a sidechain with the structure —NQ$^1$Q$^2$ directly or indirectly bound to Ar$^1$, wherein:

Ar$^1$ and Ar$^2$ are independently selected from the group consisting of phenylene and substituted phenylene; and Q$^1$ and Q$^2$ are independently selected from the group consisting of phenyl and substituted phenyl;

and further wherein when said sidechain is directly bound to Ar$^1$, then at least one of the following is satisfied:

(a) the sidechain is —(N$^+$Q$^1$Q$^2$Q$^3$)A$^-$, wherein Q$^3$ is selected from the group consisting of alkyl, substituted alkyl, heteroalkyl, and substituted heteroalkyl, and A$^-$ is a negatively charged counterion; and (b) is least one of Ar$^1$, Ar$^2$, Q$^1$, and Q$^2$ is substituted with a substituent selected from —SO$_2$H, —COOH, or —P(O)OH$_2$ groups; C$_1$–C$_{20}$ hydrocarbyl or heteroatom-containing C$_1$–C$_{20}$ hydrocarbyl substituted with one or more —SO$_2$H, —COOH, or —P(O)OH$_2$ groups; or with organic or inorganic sulfonate, carboxylate or phosphonate salts; or a combination thereof.

43. The polymer of claim 42, wherein Ar$^1$ is phenylene and Ar$^2$ is substituted phenylene.

44. The polymer of claim 43, wherein Ar$^2$ is substituted with —NQ$^1$Q$^2$.

45. The polymer of claim 42, wherein Ar$^1$ and Ar$^2$ are phenylene and Q$^1$ and Q$^2$ are phenyl.

46. A conjugated polymer having the structure

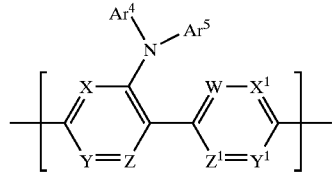

wherein:

Ar$^4$ and Ar$^5$ are independently selected from aryl, heteroaryl, substituted aryl and subustituted heteroaryl groups each containing one or two aromatic rings;

X, Y, and Z are independently selected from the group consisting of N, CH, and CR$^1$, wherein R$^1$ is selected from the group consisting of —(Ar$^3$)$_n$-NAr$^4$Ar$^5$, C$_1$–C$_{12}$ alkyl, fluorinated C$_1$–C$_{12}$ alkyl, C$_1$–C$_{12}$ alkoxy, fluoro, cyano, nitro, —SO$_3$H, —COOH, —O(PO)(OH)$_2$, and organic and inorganic sulfonate, carboxylate and phosphonate salts; and W, X$^1$, Y$^1$, and Z$^1$ are independently selected from the group consisting of N and CH.

47. The polymer of claim 46, wherein W, X, Y, Z, X$^1$, Y$^1$, and Z$^1$ are CH.

48. A conjugated polymer having the structure of formula (Va)

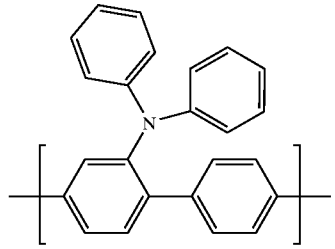

(Va)

* * * * *